United States Patent [19]

Niwa

[11] Patent Number: 5,532,932
[45] Date of Patent: Jul. 2, 1996

[54] NUMERICAL CONTROL UNIT

[75] Inventor: Tomomitsu Niwa, Aichi, Japan

[73] Assignee: Mitsubishi Denki Kabushiki Kaisha, Tokyo, Japan

[21] Appl. No.: 405,025

[22] Filed: Mar. 16, 1995

Related U.S. Application Data

[62] Division of Ser. No. 935,876, Aug. 26, 1992.

[30]     Foreign Application Priority Data

Sep. 2, 1991 [JP] Japan .................................. 3-221587

[51] Int. Cl.$^6$ .......................... G05B 19/416; G06F 15/18
[52] U.S. Cl. ................. 364/474.3; 395/900; 364/474.15; 364/474.31
[58] Field of Search ............................ 364/148, 167.01, 364/474.31, 474.15, 474.02, 474.3; 395/900, 61, 903, 904; 318/571

[56]              References Cited

U.S. PATENT DOCUMENTS

| | | | |
|---|---|---|---|
| 5,185,849 | 2/1993 | Miyazawa et al. ................. | 395/900 X |
| 5,244,695 | 9/1993 | Basehore ............................. | 364/148 X |
| 5,245,698 | 9/1993 | Matsunaga ......................... | 395/900 X |
| 5,267,141 | 11/1993 | Morita et al. ................... | 364/474.04 X |
| 5,295,061 | 3/1994 | Katayama et al. ...................... | 364/157 |

OTHER PUBLICATIONS

Spakai et al—"A Fuzzy Controller in Turning Process Automation"—Industrial Applications of Fuzzy Control; Elsevier Science Publishers B.V. North–Holland 1985.

Fang et al—"On Predicting Chip Breakability in Machining of Steels with Carbide Tool Inserts Having Complex Chip Groove Geometries"—Elsevier Science Publishers B.V.: 1991.

Chen et al.—"A Surface Grinding Process Advisory System with Fuzzy Logic"—Control of Manufacturing Processes ASME 1991; DSC vol. 28/PED-vol. 52.

Primary Examiner—Joseph Ruggiero
Attorney, Agent, or Firm—Sughrue, Mion, Zinn, Macpeak & Seas; Richard C. Turner; Joseph J. Buczynski

[57]                ABSTRACT

A numerical control unit for changing a cutting condition of a machine tool during machining of a workpiece. The numerical control unit includes a knowledge storage section for storing at least two rules for changing the cutting condition. At least one of the rules defines a rate at which movement of the machine tool is decelerated based on the position of the machine tool with respect to a corner of the workpiece. Other rules may define the rate at which movement of the machine tool is decelerated based on the shape of the corner of the workpiece being machined. Also, the other rules could be established based on the material of the tool or workpiece. The knowledge storage section further includes a rule description part and assessment functions. The numerical control unit further includes an inferring section for inferring the optimum value of the cutting condition on the basis of at least the rule or rules which define the rate at which movement of the machine tool is decelerated based on the position of the machine tool with respect to the corner of the workpiece. The numerical control unit then causes a workpiece to be machined in accordance with the cutting condition inferred by the inferring section.

23 Claims, 21 Drawing Sheets

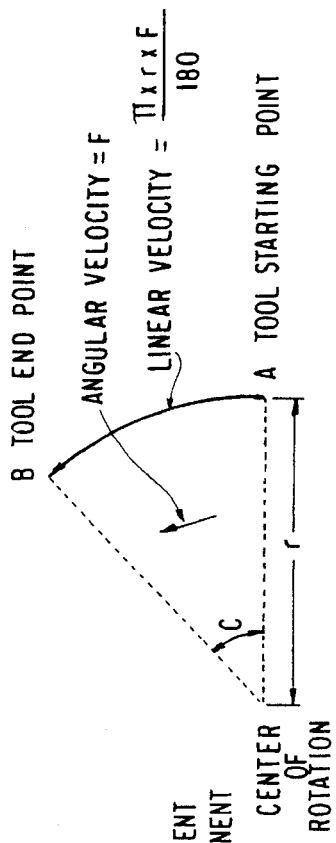

FIG. 4a PRIOR ART

ANGULAR VELOCITY = F $$\text{LINEAR VELOCITY} = \frac{\pi \times r \times F}{180}$$

B TOOL END POINT
A TOOL STARTING POINT
CENTER OF ROTATION

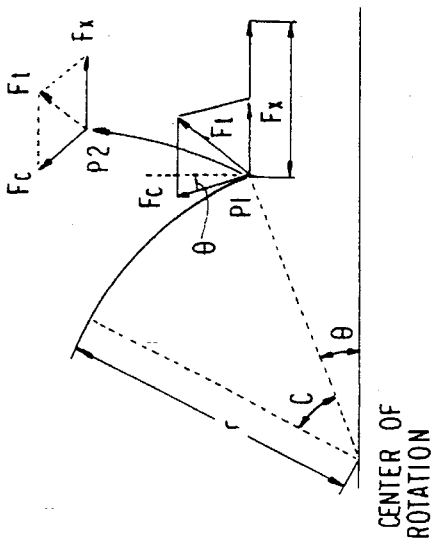

FIG. 4b PRIOR ART

Fx IS CONSTANT IN BOTH MAGNITUDE AND DIRECTION
Fc IS CONSTANT IN MAGNITUDE BUT CHANGES IN DIRECTION
Ft CHANGES IN BOTH MAGNITUDE AND DIRECTION

CENTER OF ROTATION

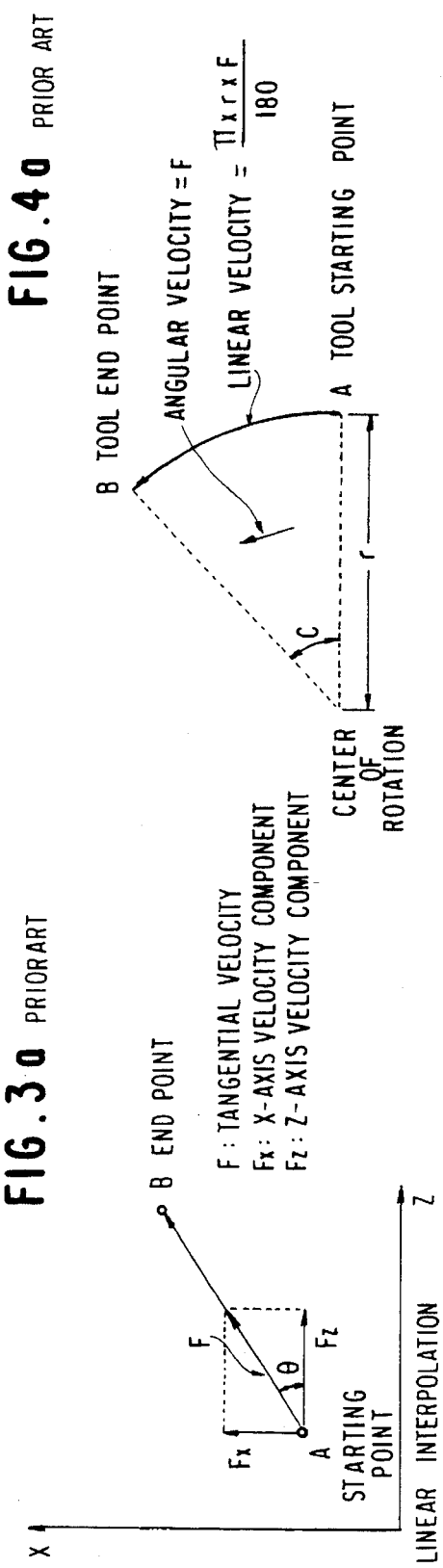

FIG. 3a PRIOR ART

B END POINT
F : TANGENTIAL VELOCITY
Fx : X-AXIS VELOCITY COMPONENT
Fz : Z-AXIS VELOCITY COMPONENT

A STARTING POINT

LINEAR INTERPOLATION

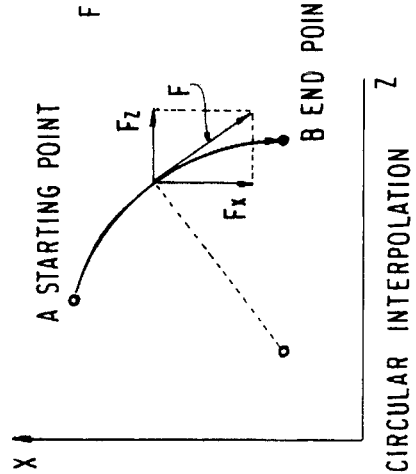

FIG. 3b PRIOR ART $$F = \sqrt{F_x^2 + F_z^2}$$

A STARTING POINT
B END POINT

CIRCULAR INTERPOLATION

FIG. 17a  METHOD 1 : WHEN THE TOOL HAS APPROACHED THE CORNER, THE TOOL FEEDRATE IS REDUCED AS IN FUNCTION 1.
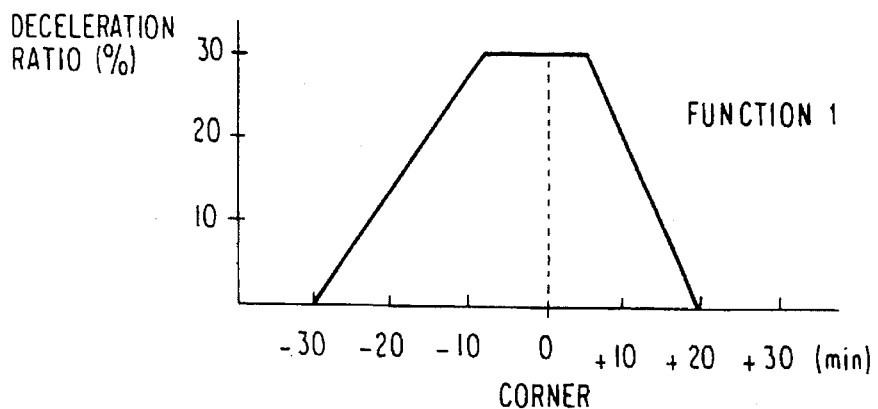
FIG. 17b  METHOD 2 : THE DECELERATION RATIO OF THE TOOL FEEDRATE IS CHANGED ACCORDING TO THE BEVEL OF THE CORNER.
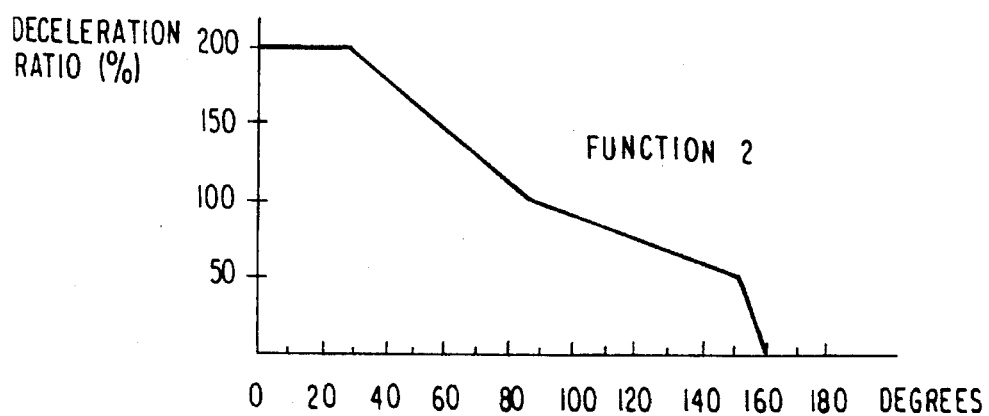

| R1 | : | IF | POS | IS | A1 | AND | ANG | IS | B1 | THEN | FEED | IS | C1 |
| R2 | : | IF | POS | IS | A1 | AND | ANG | IS | B2 | THEN | FEED | IS | C2 |
| R3 | : | IF | POS | IS | A1 | AND | ANG | IS | B3 | THEN | FEED | IS | C3 |
| R4 | : | IF | POS | IS | A1 | AND | ANG | IS | B4 | THEN | FEED | IS | C4 |
| R5 | : | IF | POS | IS | A1 | AND | ANG | IS | B5 | THEN | FEED | IS | C5 |

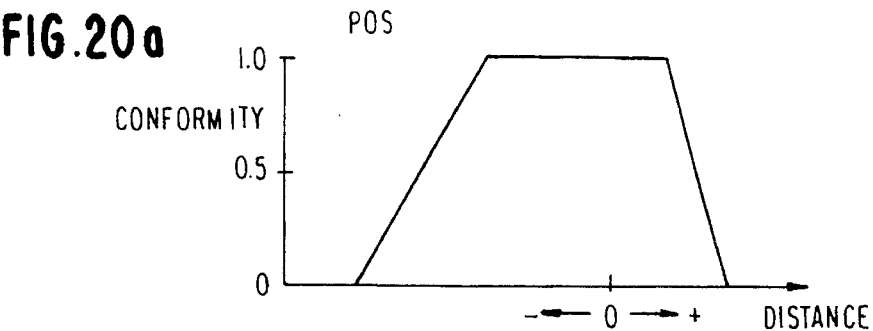
FIG.20a
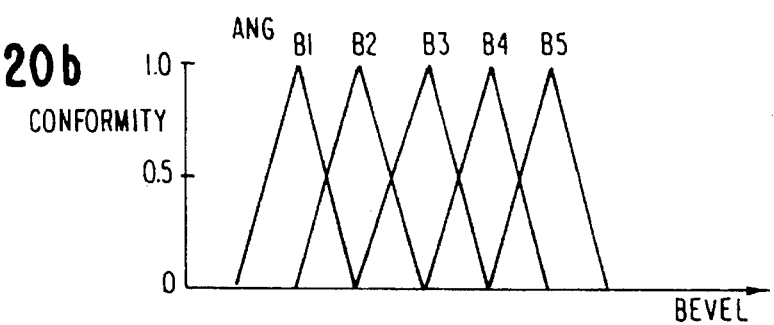
FIG.20b
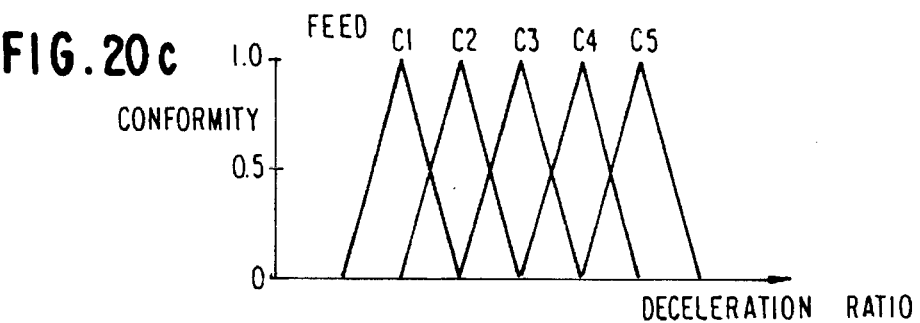
FIG.20c
FIG.21
| R1 | : | IF | DIR | IS | A1 | THE | FEED | IS | B1 |
| --- | --- | --- | --- | --- | --- | --- | --- | --- | --- |
| R2 | : | IF | DIR | IS | A2 | THE | FEED | IS | B2 |
| R3 | : | IF | DIR | IS | A3 | THE | FEED | IS | B3 |
| R4 | : | IF | DIR | IS | A4 | THE | FEED | IS | B4 |
| R5 | : | IF | DIR | IS | A5 | THE | FEED | IS | B5 |
| R6 | : | IF | DIR | IS | A6 | THE | FEED | IS | B6 |
| R7 | : | IF | DIR | IS | A7 | THE | FEED | IS | B7 |

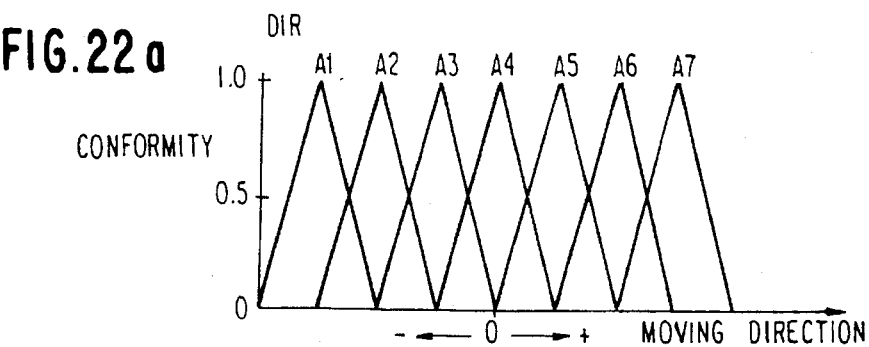
FIG.22a
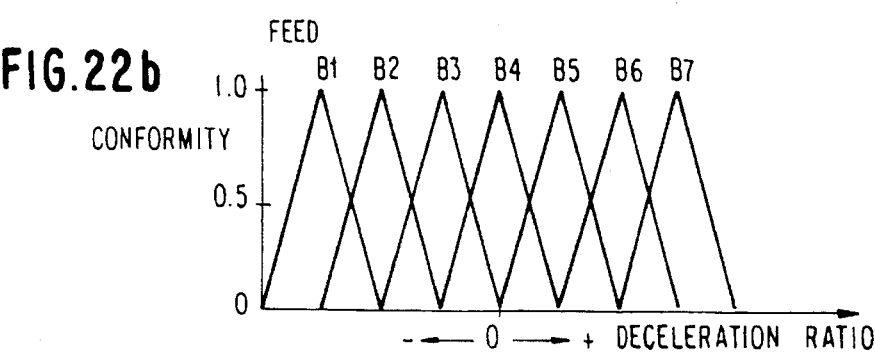
FIG.22b
FIG.23
| R1 | : | IF | DIR | IS | A1 | THE | FEED | IS | B1 |
| R2 | : | IF | DIR | IS | A2 | THE | FEED | IS | B2 |
| R3 | : | IF | DIR | IS | A3 | THE | FEED | IS | B3 |
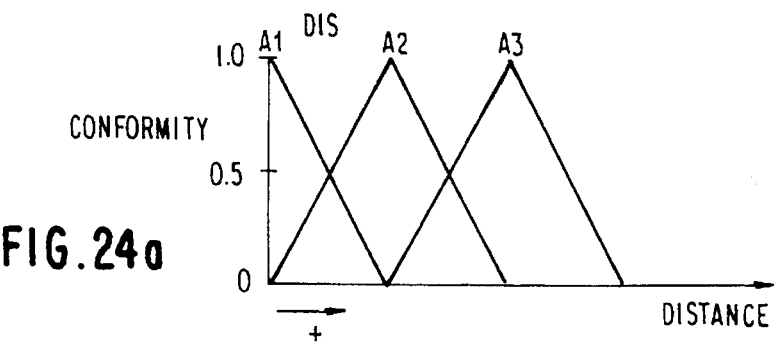
FIG.24a
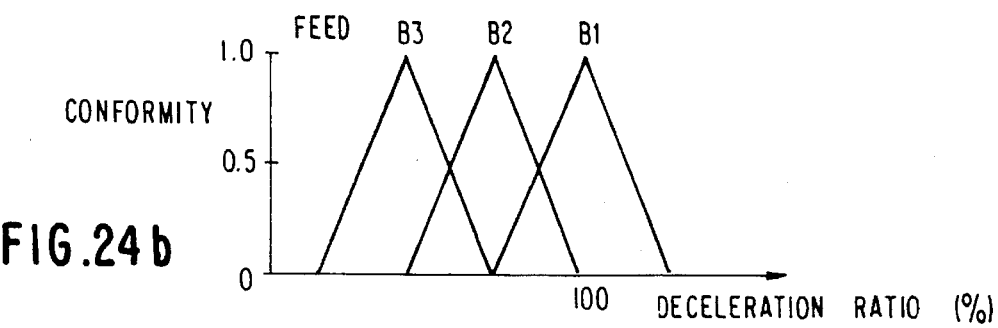
FIG.24b

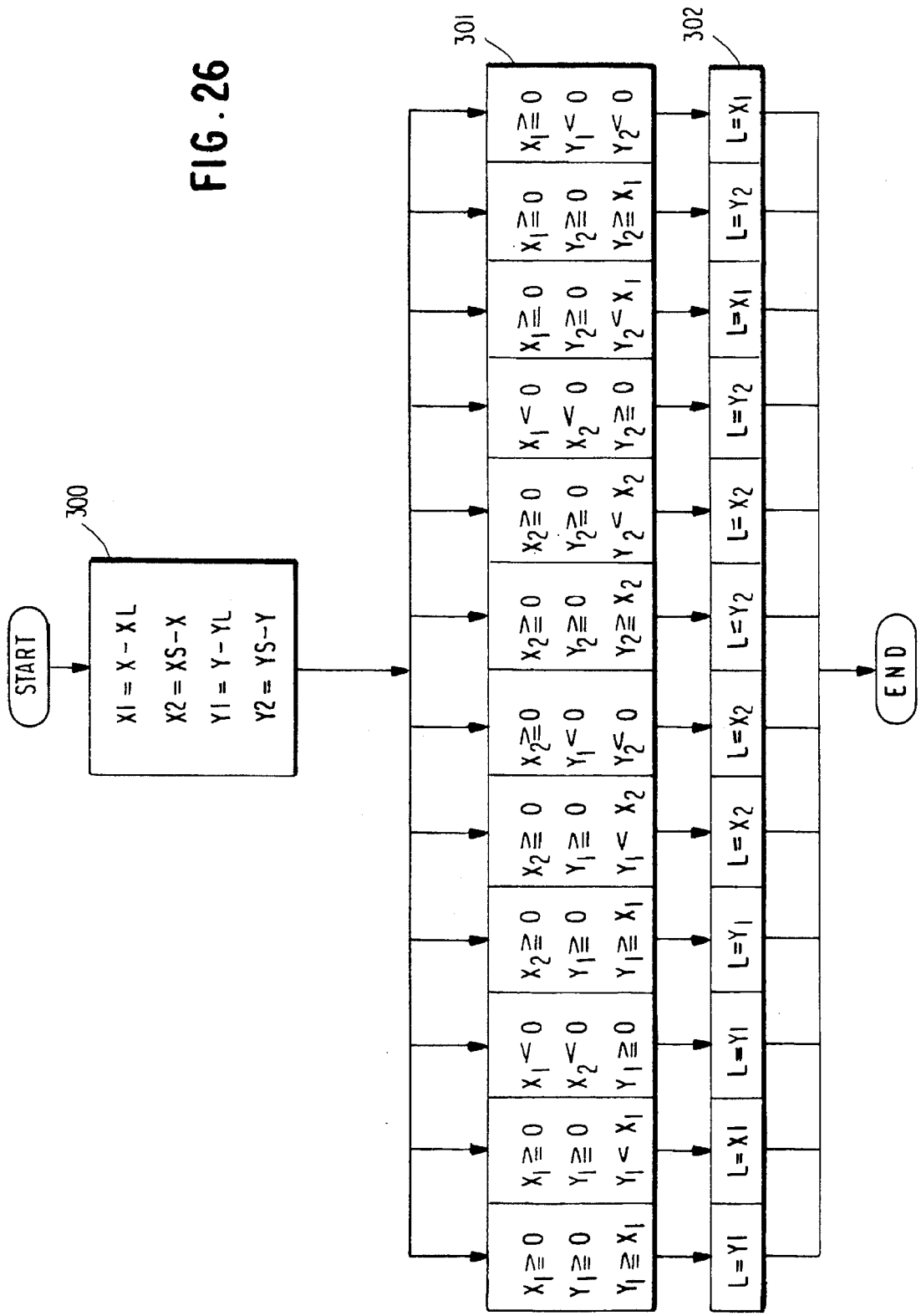

| WORK\TOOL | T0 | T1 | T2 | T3 | T4 | T5 | T6 | T7 | T8 | T9 |
|---|---|---|---|---|---|---|---|---|---|---|
| W0 | F00 | F01 | F02 | F03 | F04 | F05 | F06 | F07 | F08 | F09 |
| W1 | F10 | F11 | F12 | F13 | F14 | F15 | F16 | F17 | F18 | F19 |
| W2 | F20 | F21 | F22 | F23 | F24 | F25 | F26 | F27 | F28 | F29 |
| W3 | F30 | F31 | F32 | F33 | F34 | F35 | F36 | F37 | F38 | F39 |
| W4 | F40 | F41 | F42 | F43 | F44 | F45 | F46 | F47 | F48 | F49 |
| W5 | F50 | F51 | F52 | F53 | F54 | F55 | F56 | F57 | F58 | F59 |
| W6 | F60 | F61 | F62 | F63 | F64 | F65 | F66 | F67 | F68 | F69 |
| W7 | F70 | F71 | F72 | F73 | F74 | F75 | F76 | F77 | F78 | F79 |
| W8 | F80 | F81 | F82 | F83 | F84 | F85 | F86 | F87 | F88 | F89 |
| W9 | F90 | F91 | F92 | F93 | F94 | F95 | F96 | F97 | F98 | F99 |

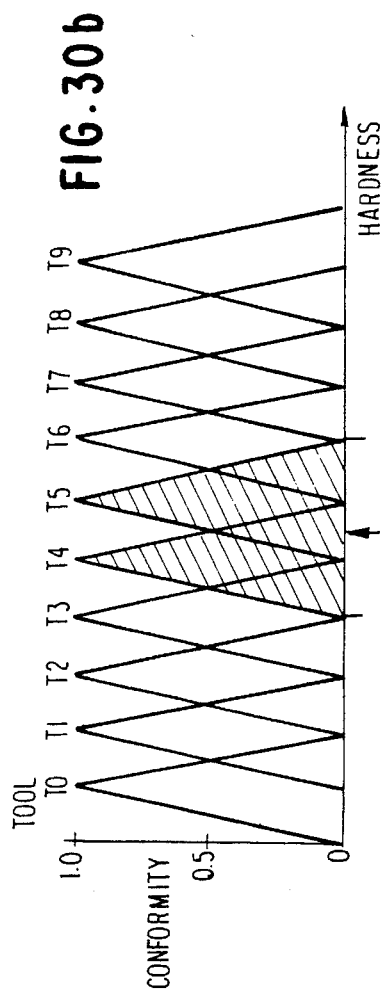
FIG. 30a
$R_{ij}$ : IF TOOL IS $T_i$ AND WORK IS $W_j$ THEN $F_{ij}$
$i = 0-9$    $j = 0-9$
FIG. 30b
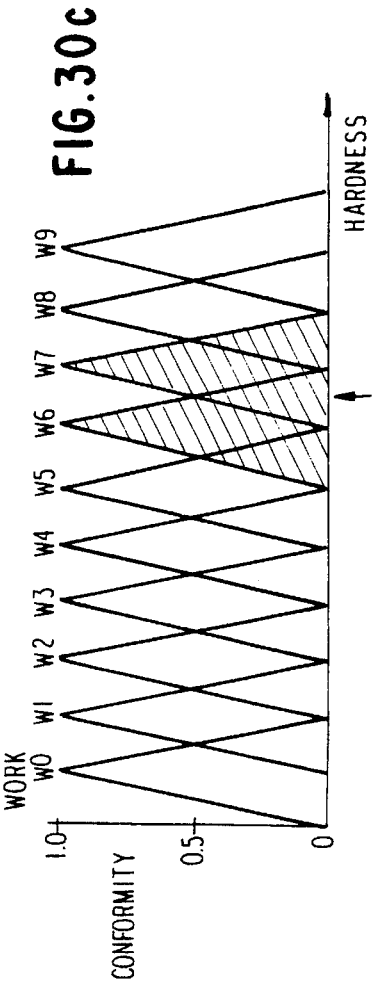
FIG. 30c
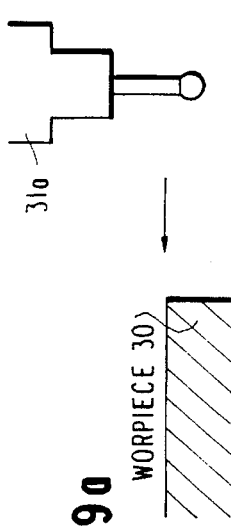
FIG. 29a
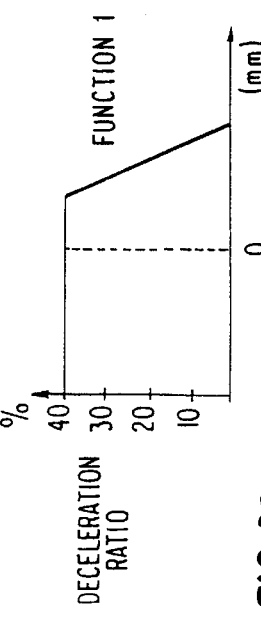
FIG. 29b
FIG. 29c

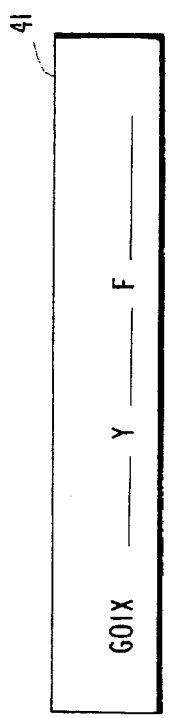
FIG. 34a
PRIOR ART
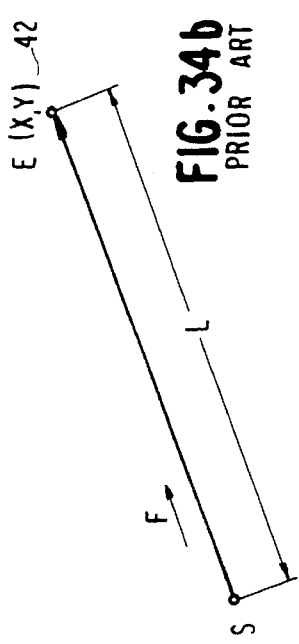
FIG. 34b
PRIOR ART
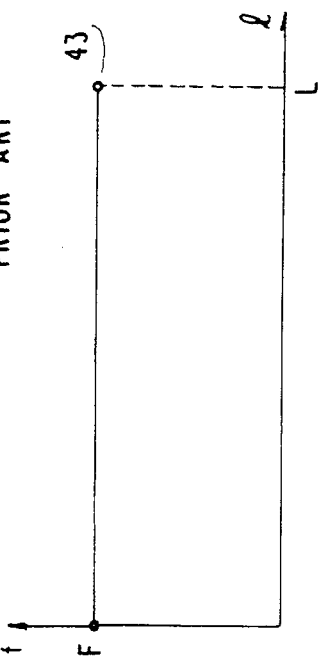
FIG. 34c
PRIOR ART
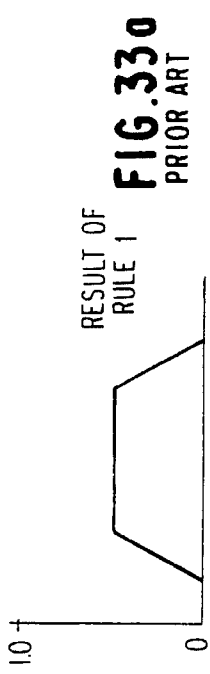
FIG. 33a PRIOR ART
RESULT OF RULE 1
FIG. 33b PRIOR ART
RESULT OF RULE 2
FIG. 33c PRIOR ART
RESULT OF RULE 3
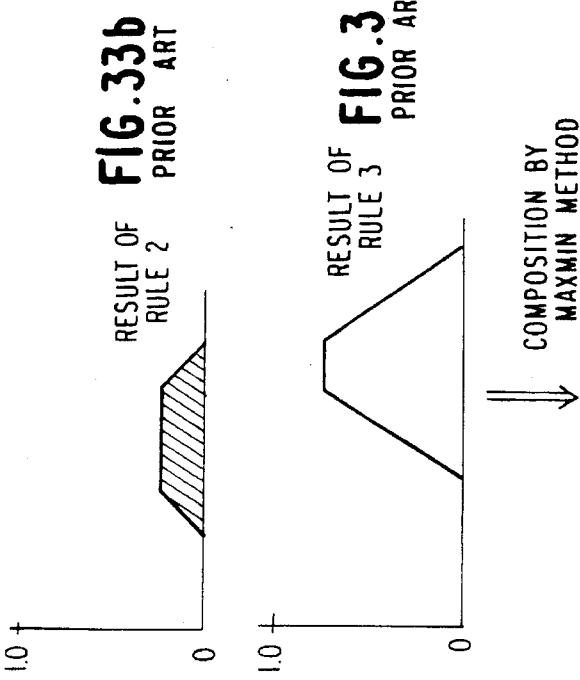
FIG. 33d PRIOR ART

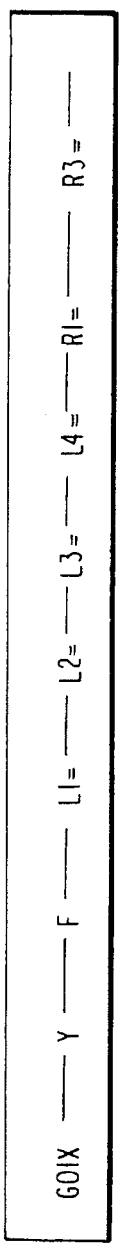
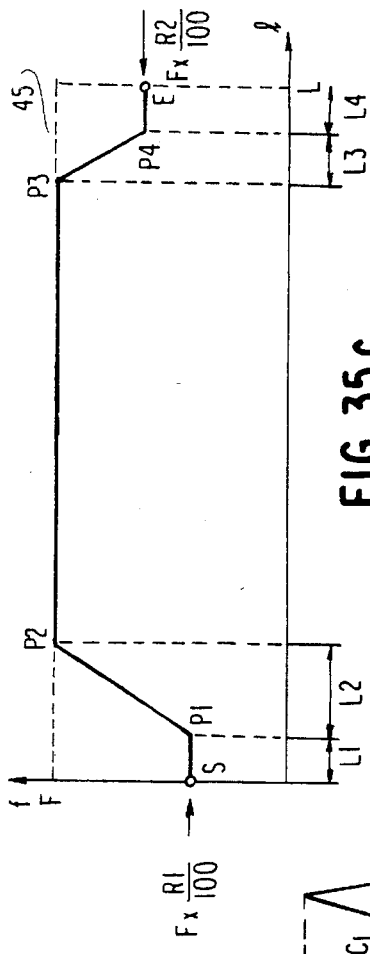
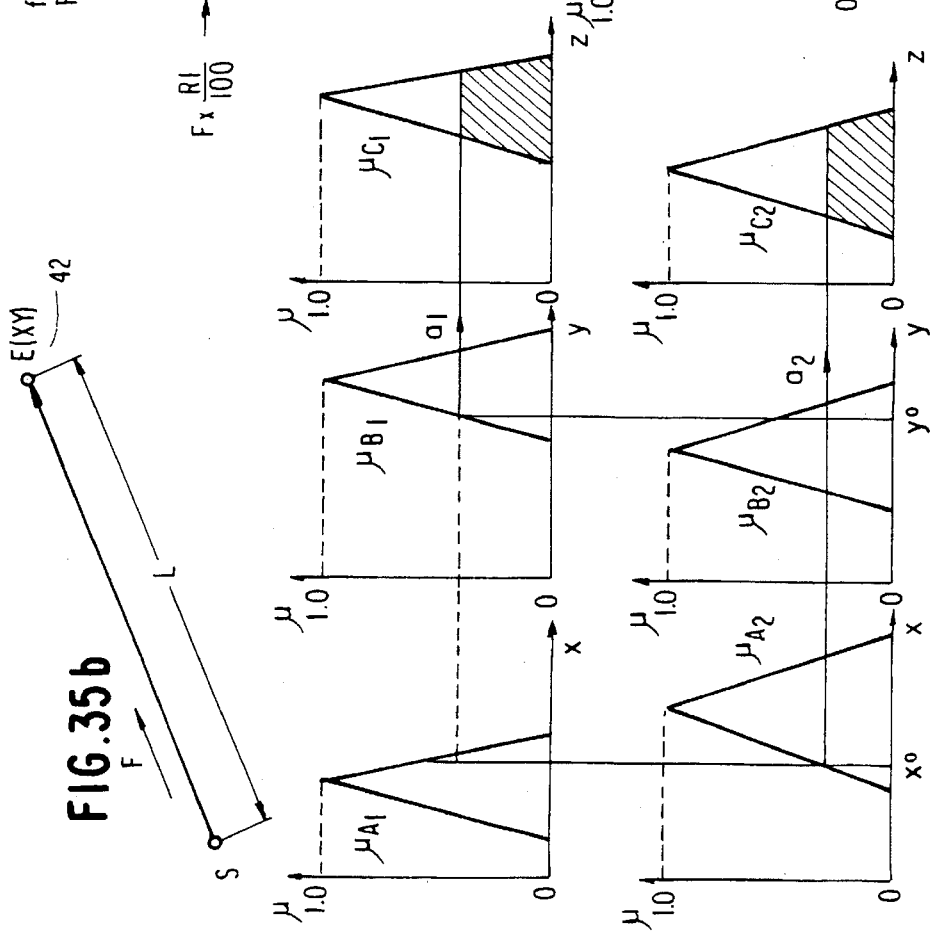
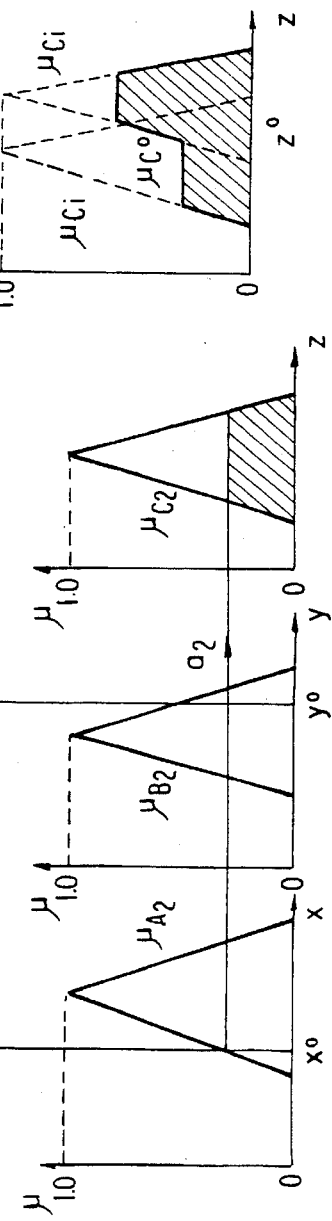
FIG. 35a
FIG. 35b
FIG. 35c
FIG. 37

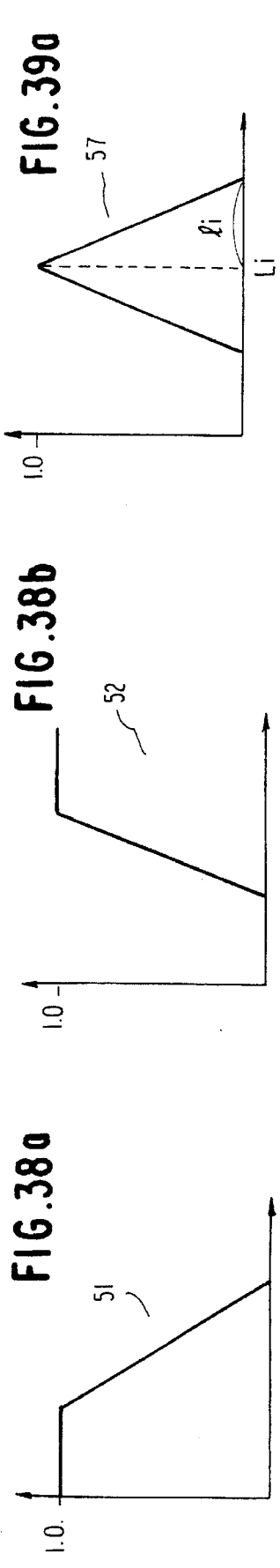
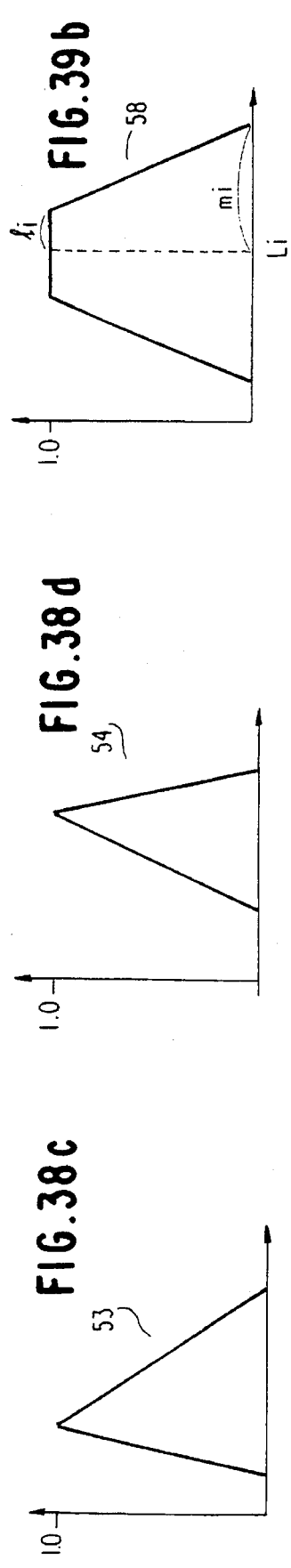
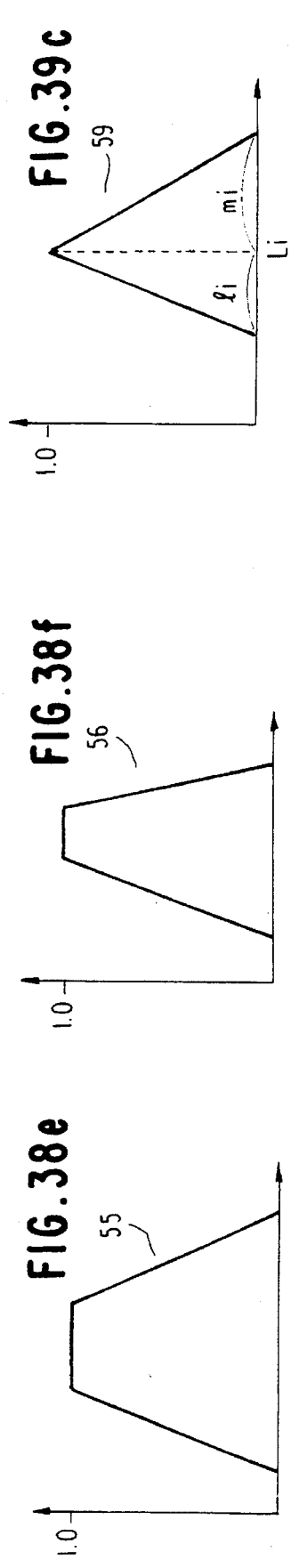

| R1 | : | IF | DIR | IS | (A1, a1) | THEN | FEED | IS | (B1, b1) |
| R2 | : | IF | DIR | IS | (A2, a2) | THEN | FEED | IS | (B2, b2) |
| R3 | : | IF | DIR | IS | (A3, a3) | THEN | FEED | IS | (B3, b3) |

| R1 | : | IF | DIR | IS | A1 | THEN | FEED | IS | B1 | VAL = 1.2 |
| R2 | : | IF | DIR | IS | A2 | THEN | FEED | IS | B2 | VAL = 0.7 |
| R3 | : | IF | DIR | IS | A3 | THEN | FEED | IS | B3 | VAL = 1.0 |

NUMERICAL CONTROL UNIT

This is a divisional of application No. 07/935,876 filed Aug. 26, 1992.

BACKGROUND OF THE INVENTION

1. Field of the Invention

The present invention relates to a numerically controlled machine tool and especially to the tool feedrate control of a numerical control unit.

2. Description of the Background Art

A numerical control unit performs numerical control processing in accordance with a machining program instructed from paper tape or the like and drives a machine tool according to the results of said processing, causing a workpiece to be machined as instructed.

FIG. 1 is a block diagram of a numerical control unit known in the art. A machining program read from a tape reader 11 is stored into a memory 12. When it is executed, the machining program is read from the memory 12 on a block basis. The program is first processed by a controller 17 containing a central processing unit (CPU), a control program memory, etc. The controller 17 then performs numerical control processing in accordance with the machining program, driving the servo motor of a machine tool 1 to move a table or a tool post according to a move command or carrying out control, such as machine tool 1 coolant ON/OFF, spindle forward rotation/reverse rotation/stop, via a control box 13. The numeral 16 indicates a control panel having controls for giving zeroing, jog and other commands, 14 a manual data input device (referred to as the "MDI") employed to manually enter various data to the controller 17, and 15 a display unit for displaying the current position and other data of the machine, said devices 11 to 17 comprising a computer numerical control unit (referred to as the "CNC unit"). Including the CPU, control program memory, etc., as described above, the controller 17 in the CNC unit performs predetermined numerical control processing on the basis of the control program and machining program, thereby controlling the machine tool 1. Generally, the machining of a workpiece on a machine tool is a removing operation which takes away an unnecessary portion as chips by the relative motion between a tool and the workpiece. In this removing operation, machining efficiency is determined by the amount of chips taken away per unit time. To increase the machining efficiency, this chip removal amount per unit time may only maximized. Practically, however, there are certain restrictions, e.g., the limitation of the load applied to the machine and tool and the accuracy required for a surface to be machined. Moreover, the chip removal amount per unit time is determined by machining conditions. In a turning operation, the machining conditions are workpiece speed per unit time, the relative feedrate of the tool to the workpiece, and the depth of cut by the tool into the workpiece. In a milling operation, the machining conditions are tool speed per unit time, the relative feedrate of the tool to the workpiece, and the depth of cut by the tool into the workpiece. Namely, in either of the turning and milling operations, controlling the relative feedrate of the tool to the workpiece preferably is an extremely significant machining element in the removing operation. An unnecessary reduction in this relative feedrate deteriorates the machining efficiency and increases machining time. Its increase over a permissible value adversely affects machining accuracy and overloads the tool, machine, and other system components.

FIG. 2 is a block diagram of the key components of a known feedrate control section. The machining program is read from the memory 12 in FIG. 1 block by block. Each block is analyzed by the controller 17 and the result of the controller analysis is then fed to a pulse distribution processor 21 as CNC command data 20 in FIG. 2, i.e., as the move command and feedrate command of each axis. The pulse distribution processor 21 calculates for each axis a travel pulse per unit time from the move command and feedrate command of each axis and feeds them to the servo controller 22 of each axis. This travel pulse is used by the servo controller 22 to drive a servo motor 23 of the machine tool 1.

In the CNC unit, there are generally two ways of moving the tool; one is to move the tool on a straight line as shown in FIG. 3(a) illustrating linear interpolation, and the other is to move the tool on an arc as shown in FIG. 3(b) illustrating circular interpolation. In the case of the linear interpolation, a feedrate F is a vectorial value connecting a starting point and an end point as shown in FIG. 3(a) and axial velocity components are:

$$Fz = F\cos\theta$$

$$Fx = F\sin\theta$$

where Fx is a velocity component in an X axis direction, Fz a velocity component in a Z axis direction, and θ an angle between a Z axis and a vector indicated by the starting point A and end point B.

When the tool moves on an arc, the feedrate F is always a tangential velocity vector value at a point on the arc as shown in FIG. 3(b), i.e.:

$$F = \sqrt{Fx^2 + Fz^2}$$

The moving axes of a CNC machine tool include straight-motion axes and rotating axes. The straight-motion axes move on a straight line relative to coordinate axes, e.g., X, Y and Z axes shown in FIG. 14 illustrating control axes in the numerical control unit. The rotating axes make a rotary motion relative to the X, Y and Z axes, e.g., A, B and C axes. In the conventional art, the CNC unit controls the straight-motion axes and rotating axes in an entirely identical manner, i.e., when controlling the rotating axes, the CNC unit provides move command values as angles and handles all numerical values given for the feedrate F as linear velocity. For example, the CNC unit treats 1° of the rotating axis as equivalent to 1 mm of the straight-motion axis, and processes the operations of the rotating and straight-motion axes equally, even though their operations are totally different inherently. In the CNC unit, the feedrate in a single specified block is always identical within that single block.

In the conventional CNC unit constructed as described above, the instructed feedrate F is the relative feedrate of the actual workpiece and tool if the straight-motion axes are specified. On the other hand, if the rotating axes, i.e., the axes rotating around the X, Y and Z axes, are specified, the specified feedrate works as the rotary speed of the rotating axis, i.e., angular velocity, as shown in FIG. 4(a) illustrating rotating axis feed control. Therefore, a relative feedrate FC of the workpiece and tool for the rotating axes is:

$$Fc = F * \frac{\pi * r}{180}$$

where F is the specified feedrate and r is a distance between the rotating axis center and tool. Hence, if it is desired to set the relative feedrate of the workpiece and tool to F, the feedrate F0 actually specified in the instruction must be as follows:

"Mathematical Expression 1"

$$F0 = \frac{180*F}{\pi*r}$$

a first problem is that in programming, the specified feedrate F must be corrected according to Mathematical Expression 1 by taking into account the distance r between the rotating axis center and tool.

When the straight-motion axis and rotating axis are controlled simultaneously, the component of a numerical value provided by the feedrate F corresponding to each axis is identical to that employed when the straight-motion axes are controlled. It should be noted, however, that while the velocity components in straight-motion axis control remain unchanged in both magnitude and direction, those in rotating axis control change in direction as the tool moves (remain the same in magnitude), and the resultant composite feedrate in the tool advance direction varies as the tool moves. This is illustrated in FIG. 4(b) which shows feed control by the simultaneous control of the straight-motion and rotating axes. When the straight-motion axis (X axis) and rotating axis (C axis) are controlled simultaneously at the feedrate of F on the assumption that an X-axis increment command value (move command value in the X-axis direction) is x and a C-axis increment command value (rotation command value in the C-axis direction) is c, an X-axis feedrate (linear velocity) Fx and a C-axis feedrate (angular velocity) ω are:

"Mathematical Expression 2"

$$Fx = F \times \frac{X}{X^2 + c^2}$$

"Mathematical Expression 3"

$$\omega = F \times \frac{c}{X^2 + c^2}$$

Linear velocity Fc in C-axis control is represented by:

"Mathematical Expression 4"

$$Fc = \omega * \frac{\pi*r}{180}$$

Supposing that the velocity in the tool advance direction at starting point P1 is Ft and its X-axis and Y-axis velocity components are Ftx and Fty respectively, Ftx and Fty are represented:

"Mathematical Expression 5"

$$Ftx = -r\sin\left(\frac{\pi}{180}\theta\right) \times \frac{\pi}{180}\omega + Fx$$

"Mathematical Expression 6"

$$Fty = -r\cos\left(\frac{\pi}{180}\theta\right) \times \frac{\pi}{180}\omega$$

where r is a distance between the rotating axis center and tool (unit: mm) and θ is an angle between point P1 and X axis at the center of rotation. According to Mathematical Expressions 1, 2, 3, 4 and 5, composite velocity Ft is:

"Mathematical Expression 7"

$$Ft = \sqrt{ftx^2 + fty^2} =$$

$$F * \frac{\sqrt{x^2 - x*c*r\sin\left(\frac{\pi}{180}\theta\right) \times \frac{\pi}{90} + \left(\frac{\pi*r*c}{180}\right)^2}}{\sqrt{x^2 + c^2}}$$

As indicated by Mathematical Expression 7, Ft is velocity at point P1. As the C axis rotates, the value of θ changes and the value of Ft also changes. To keep the relative speed, i.e., cutting speed Ft, of the workpiece and tool as constant as possible, therefore, the angular value instructed must be minimized and the variation of the θ value must be reduced. If the θ value of a portion to be machined is large, therefore, there arises a second problem that the feedrate must be decreased. Alternatively, the machining path may be sectioned and each section controlled by a separate block, requiring the processing of several blocks for an operation.

FIGS. 5(a)–(c) illustrate a program path in a corner, FIG. 5(a) indicating a programmed path and an actual tool path. Ideally, it is desired that the programmed path matches the actual tool path. Actually, however, they are always different in corner P due to a tracking delay, etc., in a servo system. Hence, if a tool 31 turns the corner P at an obtuse angle relative to a workpiece 30 as shown in FIG. 5(b), it turns in a direction of biting the workpiece. To avoid this, measures are taken, e.g., the feedrate of the tool 31 is reduced or the tool 31 is stopped at the corner for a while. Conversely, if the tool 31 turns the corner P at a sharp angle relative to the workpiece 30 as shown in FIG. 5(c), it does not bite the workpiece but problems arise, e.g., much of the metal is left uncut or a large load is suddenly applied to the tool 31.

FIGS. 6(a) and 6(b) illustrate a corner override function that may be used by some conventional CNC units to reduce the instructed feedrate within instructed distances Le and Ls before and after the corner P at an instructed ratio (override). However, the speed is only changed at two stages, i.e., a first change within the distances Le and Ls measured by starting at the corner P and a second change in the other areas. Accordingly, there is a third problem in that the feedrate must be set to meet the speed in the most reduced speed area within the distances Le and Ls starting at the corner P. Moreover, with this function, the feedrate tends to change too suddenly.

FIGS. 7(a) and 7(b) illustrate a drilling operation as an example of drilling a workpiece 30 with a drill tool 31. FIG. 7(a) shows that the tool 31 is just beginning to cut the workpiece 30. To carry out preferred machining, the feedrate should be decreased when the tool 31 makes contact with the workpiece 30 and increased when the tool 31 has completely bitten the workpiece 30. This is because, if the tool 31 is brought into contact with the workpiece 30 at an ordinary feedrate used for machining the workpiece 30, load is suddenly impressed to the tool 31, resulting in tool 31 breakage or position offset. Hence, the tool 31 is generally positioned up to point "a" slightly before the workpiece 30, the workpiece 30 is drilled at a reduced feedrate up to point "b" where the tool 31 would bite the workpiece 30 completely, and the workpiece 30 is drilled at the ordinary feedrate from point "b" onward.

An example in FIG. 7(b) shows that the tool 31 drills a through hole in the workpiece 30. In this case, if the tool 31 drills through the workpiece 30 at the ordinary feedrate, burrs are formed on the opposite surface of the workpiece.

To avoid this, the workpiece 30 is generally drilled at the ordinary feedrate up to point "c" slightly before the tool 31 drills through the workpiece 30, and at a reduced feedrate from point "c" to a finish at point "d".

FIGS. 8(a) and 8(b) illustrate a drilling operation in a tapered portion of a workpiece, wherein FIG. 8(a) shows that the surface of the workpiece 30 that makes first contact with the tool 31 is beveled and FIG. 8(b) shows that the opposite surface is beveled. Particularly in these cases, unless the feedrate is dropped when the tool 31 makes contact with the workpiece 30 and when the tool 31 drills through the workpiece 30, drilling accuracy deteriorates, increasing the risk of breaking the tool. A fourth problem is that the machining path must be sectioned into several blocks to control the feedrate, as described above, and the feedrate for each block must be set for the worst-case scenario related to the cutting function performed in that block.

In FIGS. 9(a) and 9(b) illustrate the machining of a molding material workpiece, FIG. 9(a) shows that a workpiece 30, such as a molding material, is machined by a tool 31 and the workpiece has areas to be machined and unmachined by the tool. To increase machining efficiency and effectiveness, in accordance with the conventional teaching already described herein, the workpiece is machined in four blocks, a-b, b-c, c-d and d-e as shown in FIG. 9(b), even though the workpiece otherwise might be machined in a single block as shown in FIG. 9(a). In the machining of FIG. 9(b), it is desired at points where the workpiece is just beginning to be machined (points b and d) to decrease the feedrate of the tool 31 to soften impact on the tool 31 when it makes contact with the workpiece 30, and it is also desired at a point where the tool 31 leaves the workpiece 30 (point c) to reduce the feedrate so as not to generate burrs on the workpiece 30. However, since this change of feedrate further divides the blocks, there arises a fifth problem when the workpiece is actually machined as shown in FIG. 9(b). In particular, if quality errors still arise after consideration of the feedrate, at points b, c and d, it is inevitable that the entire feedrate must be reduced when the machining operation is performed.

FIG. 10 illustrating the machining operation of a midway die shows that the midway portion of a workpiece 30 is machined by a tool 31, wherein area a-b is a portion where the tool cuts into the workpiece and is gradually loaded, area b-c is a portion where certain load is kept applied to the tool, and area c-d is a portion where the load on the tool gradually decreases. The feedrate is generally determined with the feedrate in area b-c considered. However, if the tool is adversely affected by sudden overload in area a-b at the determined feedrate, there arises a sixth problem that it is inevitable to specify a reduced feedrate in consideration of feed in area a-b.

FIG. 11 illustrates a measurement function and shows that a workpiece 30 is measured with a measuring tool 31a, wherein the position of the workpiece 30 is measured by bringing the sensor tool 31a into contact with the workpiece 30. In this case, the measurement has been programmed in two blocks so that the tool is fed at a comparatively high rate up to point a slightly before the workpiece and at a lower measurement rate from point "a" to point "b". Because the machining path is divided into blocks in the vicinity of the measurement point (a-b) and the feedrate is reduced considerably in this area (a-b), there arises a seventh problem in that additional time is required to make measurements using the tool 31a.

FIG. 12 shows how control is carried out in no-entry area setting, illustrating a function which keeps checking whether a tool 31 enters an area 32 where the tool 31 must not enter and stops the tool at point "a" on a boundary if the tool is just beginning to enter the area 32. In this case, since the tool 31 is kept fed at the specified rate until it enters the no-entry area 32, there is an eighth problem in that the no-entry area must be defined slightly larger to ensure that the boundary is safely avoided.

In addition, generally the feedrate of a tool depends largely on an interrelation between the material of a workpiece and that of the tool. Hence, if the current tool is changed into a tool made of the other material during machining, there arises a ninth problem that the feedrate must be changed by making corrections to the machining program of the CNC unit.

Fuzzy inference logic may be applied to the control of machining operations. Fuzzy logic or fuzzy inference theory has been applied as an alternative to traditional expert systems that employ precise or "crisp" Boolean logic-based rules to the solution of problems involving judgment or control. Where the problems are complex and cannot be readily solved in accordance with the rigid principles of bilevel logic, the flexibility of fuzzy logic offers significant advantages in processing time and accuracy.

The theory of fuzzy logic has been published widely and is conveniently summarized in "Fuzzy Logic Simplifies Complex Control Problems" by Tom Williams, *Computer Design* magazine, pp 90–102 (March 1991).

In brief, however, the application of the theory requires the establishment of a set of rules conventionally referred to as "control rules", "inference rules" or "production rules" that represent the experience and know-how of an expert in the particular field in which a problem to be solved exists. The inference rules are represented in the form of IF . . . . (a conditional part or antecedent part) . . . THEN . . . . (a conclusion part or consequent part). This is conventionally referred to as an "If . . . Then" format. A large number of rules typically are assembled in an application rule base to adequately represent the variations that may be encountered by the application.

In addition, "membership functions" are defined for the "conditional parts" and the "conclusion parts". Specifically, variables in each of the parts are defined as fuzzy values or "labels" comprising relative word descriptions (typically adjectives), rather than precise numerical values. The set of values may comprise several different "levels" within a range that extends, for example, from "high" to "medium" to "low" in the case of a height variable. Each level will rely on a precise mapping of numerical input values to degrees of membership and will contain varying degrees of membership. For example, a collection of different levels of height from "high" to "low" may be assigned numerical values between 0 and 1. The collection of different levels is called a "fuzzy set" and the function of corresponding different height levels to numerical values is reflected by the "membership function. Conveniently, the set may be represented by a geometric form, such as a triangle, bell, trapezoid and the like.

Then, in the fuzzy inference control procedure, the inference control is carried out in several steps. First., a determination is made of the conformity with each of the input "labels" in the "conditional part" according to the inference rules. Second, a determination is made of conformity with the entire "conditional part" according to the inference rules. Third, the membership functions of the control variables in the "conclusion part" are corrected on the basis of the conformity with the entire "condition part" according to the inference rules. Finally, a control variable is determined on an overall basis, i.e., made crisp, from the membership functions of the control variables obtained according to the inference rules. The method of determining the control variable, i.e., obtaining a crisp value, is based on any of several processes, including the center of gravity process, the area process and the maximum height process.

The fuzzy inference rules and membership functions represent the knowledge of experts who are familiar with the characteristics of a complicated controlled object including non-linear elements, e.g. the temperature control of a plastic molding machine and the compounding control of chemicals, which are difficult to describe using mathematical models in a control theory. The fuzzy logic system employs a computer to perform the inference rule and membership function processing and thereby achieve expert-level inference.

In "Japanese Patent Disclosure Publication No. 95542 of 1990 (Cutting Adaptive Control System) fuzzy inference is applied to cutting and is made on the basis of an input signal from an external sensor. When fuzzy control is to be carried out in connection with the operations that encounter the above-stated third, fourth, fifth, sixth, seventh, eighth and ninth problems, the fuzzy inference that is to be performed must follow up the cutting of the machine tool. Since this requires very fast fuzzy inference to be made, software-executed fuzzy inference is not fast enough. Hence, a tenth problem results based on the requirement that a dedicated fuzzy chip, etc., must be installed in the CNC for performing processing on a hardware basis, leading to cost increases. Further, in a fuzzy inference method that is commonly applied to ordinary control operations (e.g., MIN__MAX or center of gravity method), if the results of Rules 1, 2 and 3 are composed as shown in FIG. 33(*a*)–33(*c*), the results of Rules 1 and 3 influence the result of composition but the result of Rule 2 has no influence on the result of composition. This indicates that the result of rule 2 is totally ignored, which poses an eleventh problem that the results of all rules have not been taken into consideration in deducing a conclusion.

Further, there are generally very important rules and not so important ones, i.e., rules are different in significance. However, there is a twelfth problem in that, conventionally, all set rules are treated equally in the known fuzzy inference methods.

SUMMARY OF THE INVENTION

An object of a first embodiment according to the present invention is to overcome the first problem by providing a CNC unit which allows a feedrate to be specified for a rotating axis as for a straight-motion axis and the specified feedrate F to be controlled to be kept at the relative speed of a tool and a workpiece. According to the first embodiment of the present invention, the setting of only a tool feedrate automatically provides that tool movement with respect to a rotating axis will be at a desired relative speed between a workpiece and a tool. This feature eliminates the necessity of specifically programming the tool feedrate in consideration of the distance from the rotating axis center to the tool, thereby significantly reducing the labor of a machining programmer.

An object of a second embodiment of the present invention is to overcome the second problem by providing a CNC unit which controls a specified feedrate F so as to be kept at the relative speed of a tool and a workpiece when movement with respect to both a straight-motion axis and a rotating axis are controlled simultaneously. According to the second embodiment of the present invention, merely the setting of only a tool feedrate guarantees the two-axis simultaneous control of a rotating axis and a straight-motion axis such that the desired relative speed between a workpiece and a tool is achieved. This allows machining to be carried out by only setting the tool feedrate in consideration of a cutting condition and eliminates the trouble of setting the feedrate under the worst-case scenario or sectioning a machining path into a plurality of blocks which is otherwise desired to be programmed as a single block, thereby considerably reducing the effort required from the machining programmer. Further according to the second embodiment of the present invention, a tool feedrate can be changed at the starting-point and end-point areas in a single block, whereby a machined section which conventionally must be segmented can be described in one block and the feedrate increased or decreased optionally and smoothly.

An object of the present invention is to overcome the third, fourth, fifth, sixth and seventh problems by providing a CNC unit which is capable of changing a feedrate within a single block.

An object of third, fourth and fifth embodiments according to the present invention is to overcome the third, fourth, fifth, sixth, seventh and eighth problems by providing a CNC unit which allows a feedrate to be controlled on the basis of preset rules within a single block without dividing a machining path into a plurality of blocks for controlling the feedrate and further allows the preset rules to be changed optionally, whereby an operator can incorporate machining know-how into a machining program.

Further, according to the third embodiment of the present invention, rules incorporating machining know-how are set in a knowledge storage section, an inferring section is provided independently of the knowledge storage section to ensure ease of additions and corrections to the rules, and the inferring section synthesizes the results of inference provided by a plurality of rules and deduces a final conclusion, whereby complex control can be easily achieved with various factors taken into consideration. In this manner, the conventional approach to changing the cutting condition step by step is improved by allowing the cutting condition to be changed in a function form, ensuring smooth cutting condition changes.

According to the fourth embodiment of the present invention, rules set in the knowledge storage section can be described in a production rule format, allowing an operator to understand the rules easily and further facilitate additions and corrections to the rules. Moreover, descriptions in the knowledge storage section are represented in rule and membership function formats to form the knowledge storage section of a two-step structure that macro, general-purpose knowledge is described by a rule and micro, special-purpose knowledge is represented by a membership function, achieving an approach which allows the optimum rule to be made up by adjusting the membership function after actual machining.

Employing tool position data in the CNC, the present invention has an advantage that fuzzy inference can be applied without making any modification, addition, etc., to hardware. The present invention can also execute fuzzy inference without carrying out actual cutting, allowing rules and membership functions to be tuned to a proper level for cutting simulation.

According to the fifth embodiment of the present invention, functions stored in the knowledge storage section can be changed optionally by the numerical control unit, allowing further optimum control to be carried out by setting the optimum function according to the machining status. This enables machining to be performed without requiring the operator to change functions if a function value may only be changed according to a particular rule after fundamental knowledge has been preset in the knowledge storage section.

An object of a sixth embodiment according to the present invention is to overcome the ninth problem by providing a CNC unit which allows a feedrate to be controlled on the basis of preset rules according to the material of a workpiece and that of a tool and further allows the preset rules to be changed optionally, whereby an operator can incorporate machining know-how into a machining program. A further object of the sixth embodiment is to provide a fuzzy inference section which allows inferring time to be reduced by making inference only on rules requiring judgement if there are many rules set.

According to the sixth embodiment of the present invention, inference is only made as to rules judged as necessary to be executed without needing to execute all rules stored in the knowledge storage section, allowing the inference speed to be increased when there are many rules.

Further, by making fuzzy inference of a feedrate from the materials of a workpiece and a tool, the present invention has an advantage that a feedrate can be extracted easily for a tool and workpiece made of new materials, i.e., a preferred conclusion can be deduced by fuzzy inference for new materials whose data has not yet been registered and considers the median hardness of the materials already registered.

An object of a seventh embodiment according to the present invention is to overcome the tenth problem by providing a fuzzy inference section which causes fuzzy inference to be made rapidly by software processing. According to the seventh embodiment of the present invention, fuzzy rules and their membership functions can be defined simultaneously and easily, requiring a small storage area for membership functions. Also, membership functions in the conclusion part of a fuzzy rule can be represented in a simple shape pattern, enabling the result of each rule to be inferred at high speed.

An object of an eighth embodiment of the present invention is to overcome the eleventh problem by providing a fuzzy inference section which causes the results of all given rules to be reflected on a conclusion. According to the eighth embodiment of the present invention, the results of fuzzy rules can be composed rapidly and all results of the rules reflected on a final conclusion, ensuring ease of membership function tuning. When combined with the seventh embodiment of the present invention, the eighth embodiment allows processing performed by dedicated hardware, etc., for the reduction of fuzzy inference time to be performed by software processing only.

An object of a ninth embodiment of the present invention is to overcome said twelfth problem by providing a fuzzy inference section which causes the significance of rules to be reflected on a conclusion.

According to the ninth embodiment of the present invention, a final conclusion can be deduced with the significance of each rule considered, and preferred inference can also be made by tuning such significance. In combination with the tuning of membership functions, the ninth embodiment allows more ideal rules to be set.

BRIEF DESCRIPTION OF THE DRAWINGS

FIG. 3(a) illustrates linear interpolation known in the art.

FIG. 3(b) illustrates circular interpolation known in the art.

FIG. 4(a) illustrates rotating axis feed control known in the art.

FIG. 4(b) illustrates feed control by simultaneous control of a straight-motion axis and a rotating axis known in the art.

FIGS. 17(a) and 17(b) show examples of rules for feedrate control set in a knowledge storage section according to the present invention.

FIGS. 20(a)–20(c) show an example of membership functions for feedrate control set in the knowledge storage section according to the present invention.

FIG. 21 shows an example of rules for feedrate control set in the knowledge storage section according to the present invention.

FIGS. 22(a) and 22(b) show an example of membership functions for feedrate control set in the knowledge storage section according to the present invention.

FIG. 23 shows an example of rules for feedrate control set in the knowledge storage section according to the present invention.

FIGS. 24(a) and 24(b) show an example of membership functions for feedrate control set in the knowledge storage section according to the present invention.

FIG. 26 is a flowchart showing a sequence of extracting the distance between the no-entry area and tool according to the present invention.

FIGS. 29(a)–29(c) illustrate how functions are generated in the knowledge storage section at the time of measurement according to the present invention.

FIGS. 30(a)–30(c) show examples of data set in the knowledge storage section employed to correct the feedrate in accordance with the tool and workpiece materials according to the present invention.

FIGS. 33(a)–33(d) illustrate the composition of rules in the MAXMIN method for fuzzy control according to the conventional control art.

FIGS. 34(a)–34(c) illustrate a tool feedrate in a single block according to the conventional art.

FIGS. 35(a)–35(c) illustrate a tool feedrate in a single block according to the present invention.

FIG. 37 illustrates an inference method according to a MAX___MIN center of gravity method for fuzzy inference according to the conventional art.

FIGS. 38(a)–38(f) illustrate membership functions for fuzzy inference according to the conventional art.

FIGS. 39(a)–39(c) illustrate membership functions for fuzzy inference according to the present invention.

DESCRIPTION OF THE PREFERRED EMBODIMENTS

Figure 13:
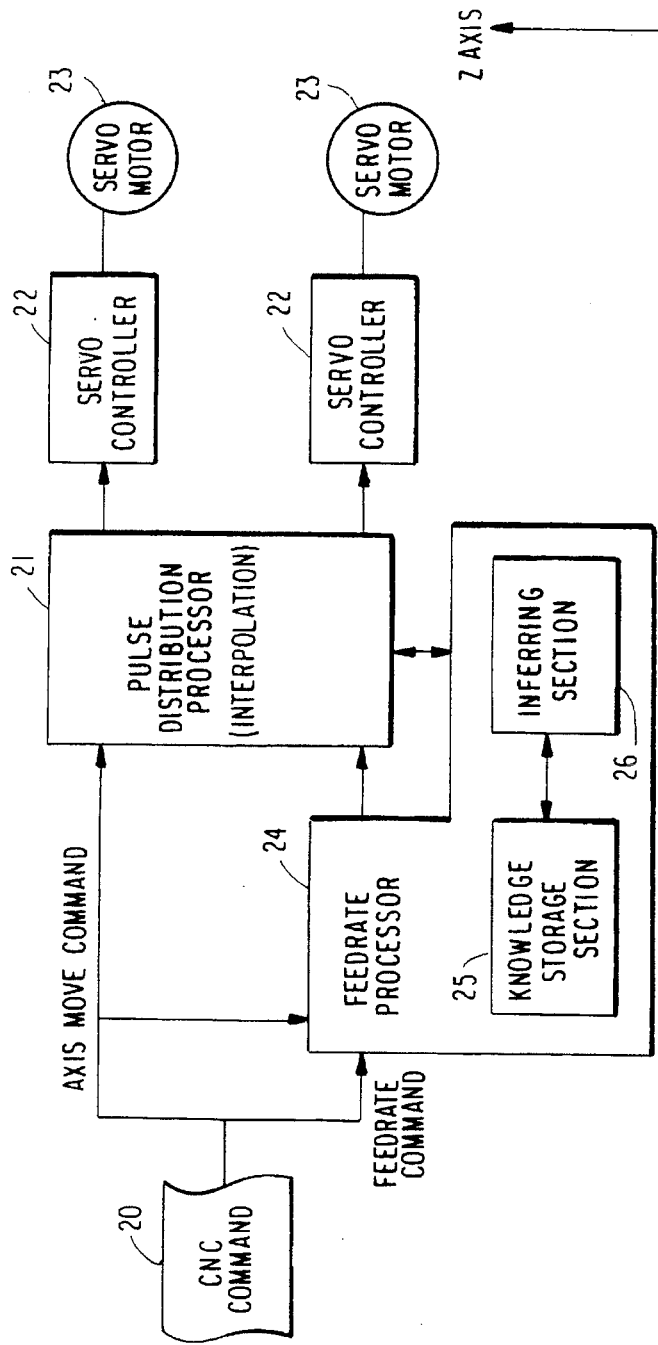
FIG. 13 is a block diagram showing the key components of a feedrate controller according to the present invention.

A first embodiment according to the present invention will now be described in reference to the appended drawings. Referring now to FIG. 13, the numerals 20 to 23 indicate parts identical or corresponding to those in the conventional unit and 24 indicates a feedrate processor.

Figure 15:
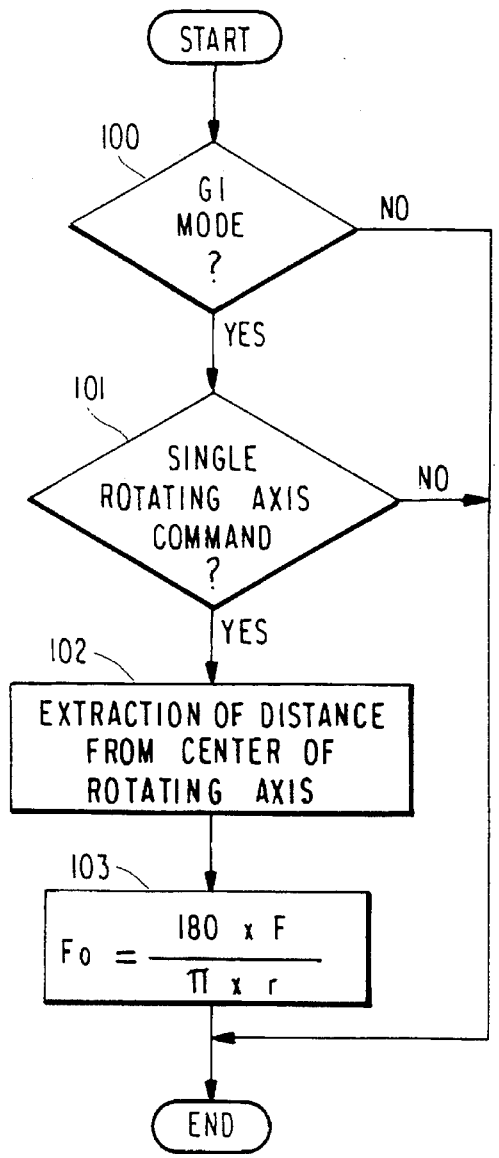
FIG. 15 is a flowchart concerned with the feedrate control of a rotating axis according to the present invention.

The operation of the present invention will now be described. As shown in a flowchart in FIG. 15 illustrating feedrate control, it is first determined whether a machining mode is a linear interpolation mode (G1 mode) or not by the feedrate processor 24 (step 100). If in the linear interpolation mode, then it is determined whether a move command is for a rotating axis alone or not (step 101). If it is for the rotating axis alone, a calculation is made to obtain a distance r between the starting point of a tool indicated by point A in FIG. 4(a) from where cutting starts and the center of the rotating axis (step 102). A compensation feedrate Fo is then calculated from a specified feedrate F according to Mathematical Expression 1 (step 103). The pulse distribution processor 21 in FIG. 13 processes this feedrate Fo in an identical manner to the conventional art as an instructed feedrate. By thus correcting the specified feedrate according to the distance r between the center of the rotating axis and the tool employed for machining, the relative speed of the workpiece and tool can be kept at the specified feedrate F.

Figure 16:
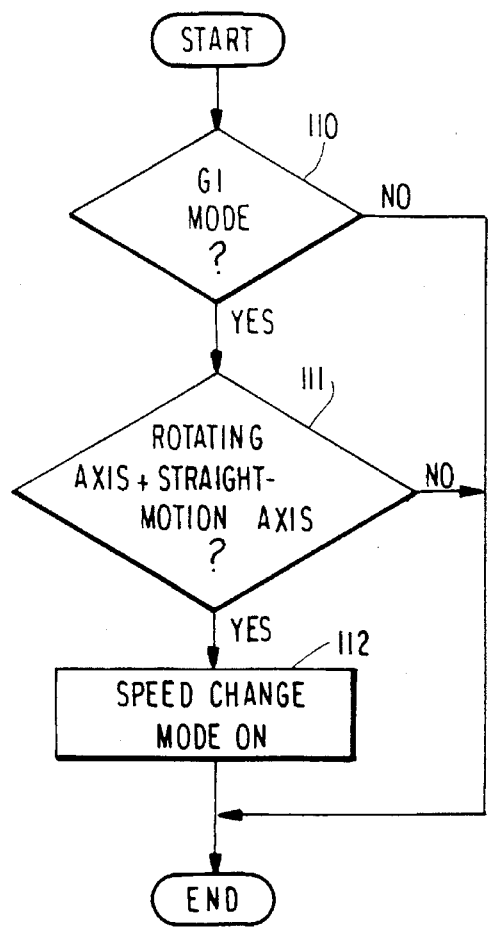
FIG. 16 is a flowchart concerned with the simultaneous speed control of the straight-motion axis and rotating axis according to the present invention.

A second embodiment according to the present invention will now be described in accordance with the appended drawings. In a similar manner to the first embodiment, as shown in a flowchart in FIG. 16 illustrating speed control for simultaneous control of a straight-motion axis and a rotating axis, it is determined whether the machining mode is the linear interpolation mode (G1 mode) or not by the feedrate processor 24 (step 110). If in the linear interpolation mode, then it is determined whether or not the move command is for two-axis simultaneous interpolation for rotating and straight-motion axes (step 111). If it is for the two-axis simultaneous interpolation, a speed change mode is switched on (step 112). When this speed change mode is on, the pulse distribution processor 24 in FIG. 13 performs pulse distribution while simultaneously correcting a feedrate so that Ft in Mathematical Expression 7 is always an instructed feedrate F, i.e., assuming that the corrected feedrate is Fo according to Mathematical Expression 7:

$$F = Fo * \frac{\sqrt{x^2 - x*c*r\sin\left(\frac{\pi}{180}\theta\right) \times \frac{\pi}{90} + \left(\frac{\pi*r*c}{180}\right)^2}}{\sqrt{x^2 + c^2}}$$

Hence,

"Mathematical Expression 8"

$$Fo = F * \frac{\sqrt{x^2 + c^2}}{\sqrt{x^2 - x*c*r\sin\left(\frac{\pi}{180}\theta\right) \times \frac{\pi}{90} + \left(\frac{\pi*r*c}{180}\right)^2}}$$

where x is an X-axis travel value and c is a C-axis travel value, which are always constant within a single block. Parameter "r" is a distance between the rotating axis center and tool position P1 in FIG. 4(b), and θ is an angle between the tool position P1 and X axis at the center of rotation. Since r and θ change momentarily as the tool moves, the then r and θ are found and the corrected feedrate Fo of the specified feedrate F is calculated according to Mathematical Expression 8 and employed as the specified feedrate to perform the pulse distribution. The specified feedrate is thus corrected momentarily in accordance with the r and θ of the tool position, thereby allowing the relative speed of the workpiece and tool to be kept at the specified feedrate F.

The second embodiment of the present invention will now be described in reference to the accompanying drawings. FIG. 34 shows a machining program 41, its operation 42 and a feedrate 43 known in the art, wherein "G01" indicates linear interpolation and "X___Y___" the coordinate values of an end point. "F___" defines a tool feedrate. When a command is given by the machining program as indicated by 41, linear interpolation is executed at the feedrate F from a current tool position (point S) to a specified end point (point E) as indicated by 42. This feedrate is a constant value F as indicated by 43. FIG. 35 shows a machining program 44, its operation 42 and a feedrate 45 according to the present invention. In the machining program 44, the part:

"G01X___Y___F___"

is identical to that of the conventional machining program and so is its operation 42. The part:

"L1=___ L2=___L3___ L4___R1___R2___"

is a command for changing the tool feedrate at the starting-point and end-point areas of a block. This means that, as indicated by 45, the specified feedrate is changed to $$F * \frac{R1}{100}$$

from a starting point S to a point P1 a distance L1 away therefrom and is then restored to the value as it had been, i.e., F, up to a point P2 a distance L2 away from P1. Concerning an end-point are the feedrate is changed from F to $$F * \frac{R2}{100}$$

between a point P3 a distance (L3+L4) away from an end point E and a point P4 a distance L4 away from the same, and thereafter remains unchanged up to the end point.

Figure 36:
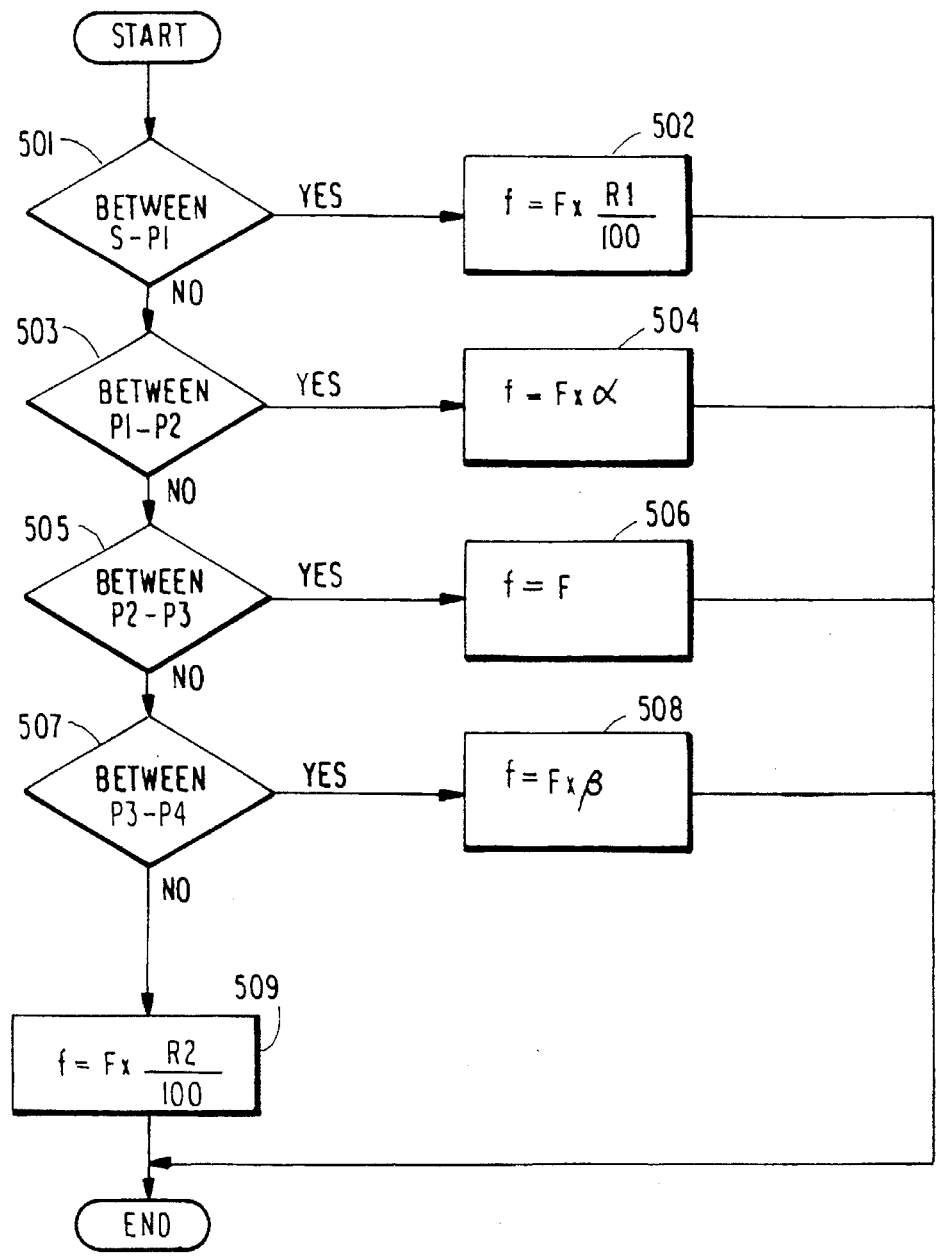
FIG. 36 is a flowchart concerned with tool feedrate control in a single block according to the present invention.

Any of L1, L2, L3 and L4, if unnecessary, need not be specified. When unspecified, it is regarded as zero. When R1 or R2 is not specified, it is regarded as 100, which indicates that no speed change is made. The processing sequence of the example shown in FIG. 33 will now be represented in the form of a flowchart in FIG. 36. First, a check is made to see if the tool is located between S and P1 (step 501). If it is located between S and P1, the tool feedrate is set to R1% of the specified value (step 502). If not between S and P1, a check is made to see if the tool is located between P1 and P2 (step 503). If between P1 and P2, the feedrate is set to F*α (step 504), where α is a numeral represented by an expression indicated by 510. If not between P1 and P2, a check is made to see if the tool is located between P2 and P3 (step 505). If between P2 and P3, the feedrate is set to F as specified (step 506). If not between P2 and P3, a check is made to see if the tool is located between P3 and P4 (step 507). If between P3 and P4, the feedrate is set to F*β (step 508), where β is a numeral represented by an expression indicated by 511. If not between P3 and P4, then the tool exists between P4 and E and therefore the tool feedrate is set to R2% of the specified value (step 509).

It will be appreciated that a linear feedrate change made between P1 and P2 or between P3 and P4 in this embodiment may also be replaced by acceleration/deceleration pattern employing a method described in Japanese Patent Disclosure Publication No. 168513 of 1984, Japanese Patent Disclosure Publication No. 18009 of 1986 etc. In this case, it is only necessary to change the expressions 510 and 511 in the flowchart in FIG. 36.

A third embodiment of the present invention will now be described in relation to the appended drawings. Referring to FIG. 13, the numerals 20 to 23 indicate parts identical or corresponding to those in the conventional unit and 24 indicates a feedrate controller including a knowledge storage section 25 and an inferring section 26.

Figure 1:
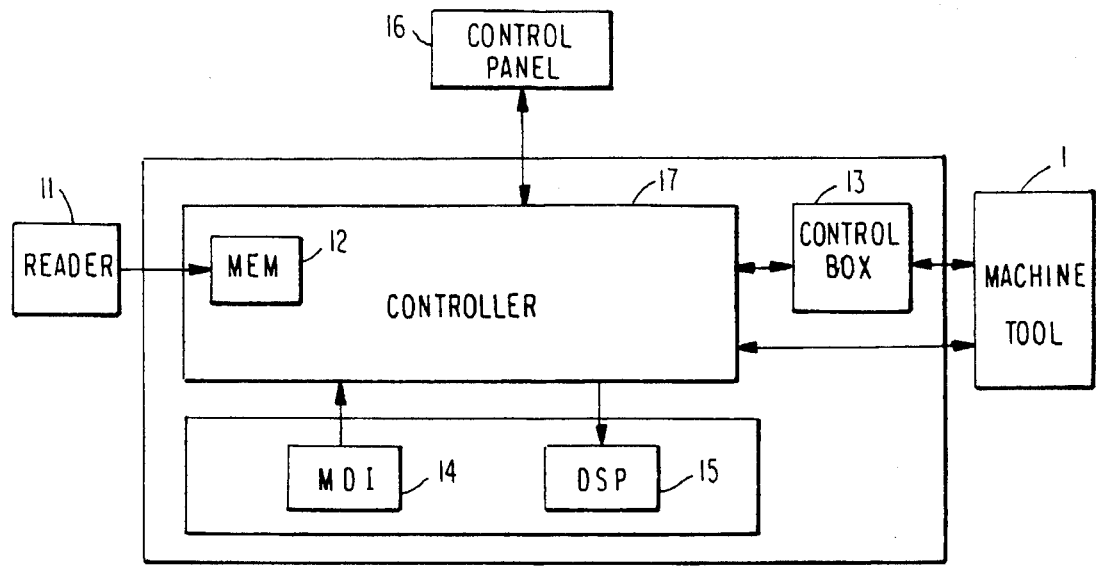
FIG. 1 is a block diagram of a known numerical control unit.
Figure 2:
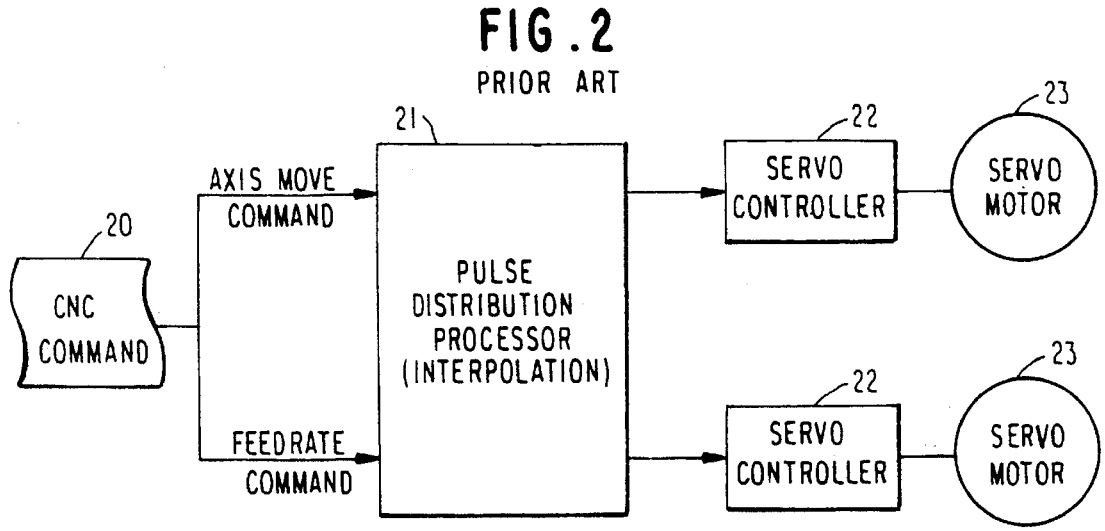
FIG. 2 is a block diagram showing the main parts of a prior art feedrate controller.
Figure 6A:
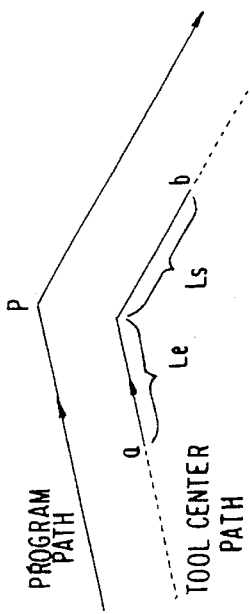
FIGS. 6(a) and 6(b) illustrate a corner override function known in the art.
Figure 6B:
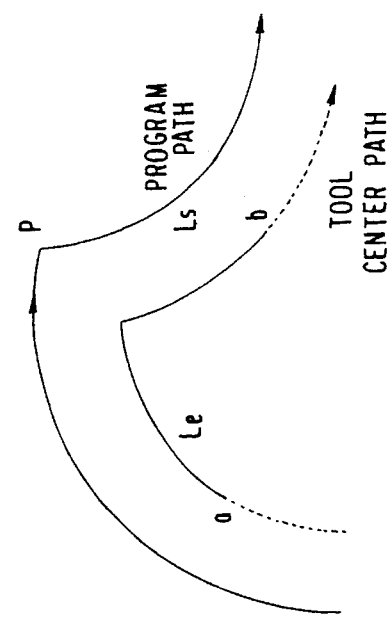
Figure 5A:
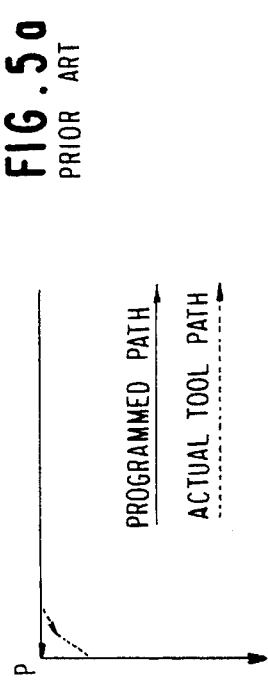
FIGS. 5(a)–5(c) illustrate program paths for machining a variety of corner shapes known in the art.
Figure 5B:
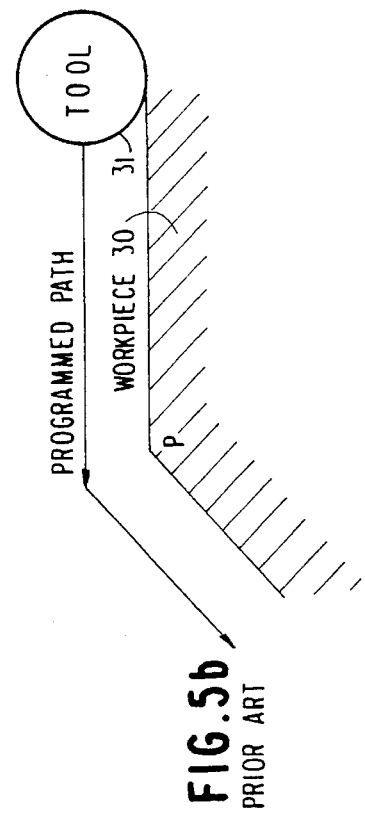
Figure 5C:
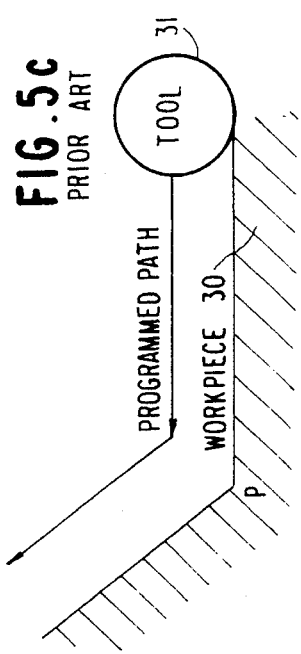

The operation of this embodiment will now be described. The knowledge storage section 25 contains a plurality of rules described for changing the feedrate at a corner as shown in FIGS. 17(*a*) and 17(*b*). For example, Rule 1 decreases the feedrate of a tool as the tool approaches the corner. Conventionally, as shown in FIGS. 6(*a*) and 6(*b*), the feedrate is simply switched according to the threshold values of a distance from the corner, i.e., when the tool has moved a certain distance Le close to the corner P, the feedrate is decreased to a particular value, and when the tool has moved a certain distance Ls away from the corner P, the feedrate is returned to the original value. In the embodiment of the present embodiment, as shown in FIG. 17(*a*), Function 1 defining a deceleration ratio according to the distance the tool has approached the corner allows the feedrate to be optionally changed. Rule 2 corrects the deceleration ratio of the tool feedrate according to the bevel angle of the corner. In general, as the bevel of the corner is sharper (closer to zero degrees), larger deceleration is made, and as the bevel is gentler (closer to 180 degrees), deceleration is smaller. In the example of the rule on the corner feed control set in FIG. 17(*b*), the feedrate is corrected by Function 2 of Rule 2 according to the bevel of the corner, with an average deceleration ratio preset in Function 1 of Rule 1.

Figures 18, 19:
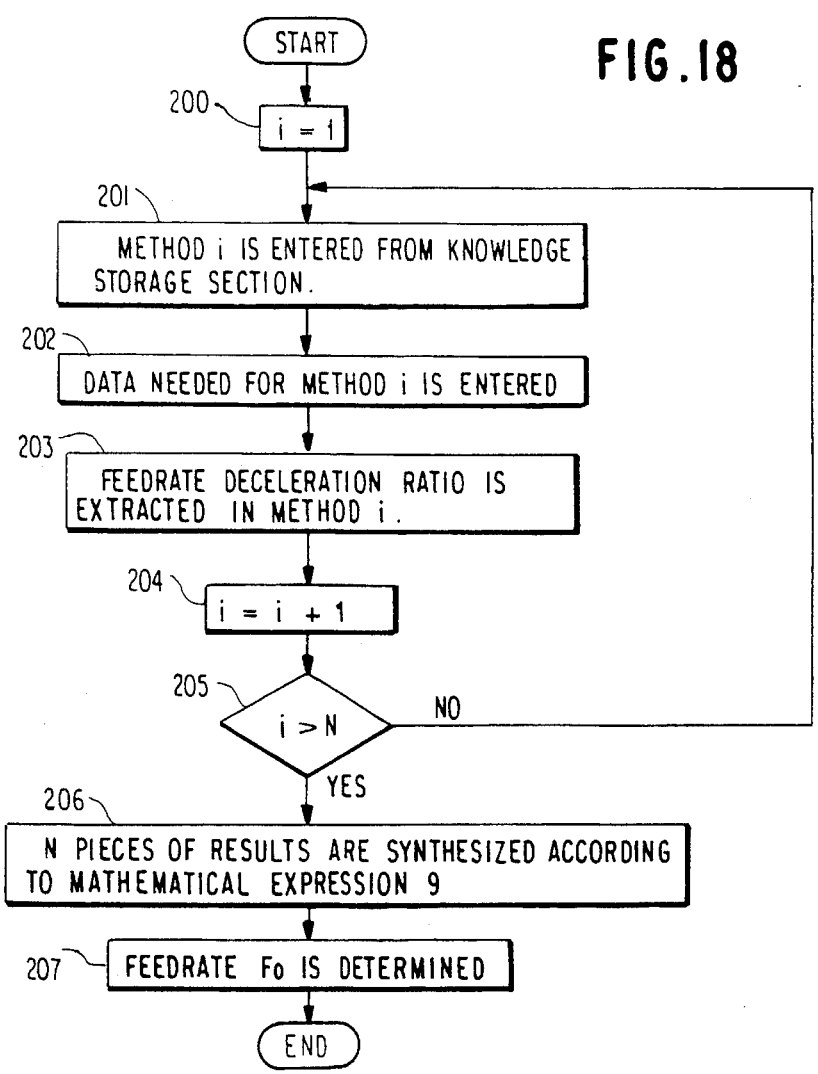
FIG. 18 is a flowchart concerned with the processing of an inferring section according to the present invention.
FIG. 19 shows an example of rules for feedrate control set in the knowledge storage section according to the present invention.

FIG. 18 is a flowchart illustrating a procedure of how the inferring section 26 practically controls the feedrate in the corner by using the rules described in the knowledge storage section 25.

The inferring section 26 first reads Rule 1 from the knowledge storage section 25 (steps 200, 201), finds a distance between the tool and corner necessary for Rule 1 and gives it as input data (step 202). The inferring section 26 extracts the deceleration ratio Z1 of the feedrate according to that distance (step 203). In this case, the deceleration ratio of the tool feedrate corresponding to the distance from the corner is extracted by employing Function 1. In a similar manner, the inferring section 26 extracts from Rule 2 the deceleration ratio Z2 of the feedrate according to the bevel angle, of the corner (steps 204, 205, 201 to 203). Since N=2 results in YES at step 205 in the present embodiment, the inferring section 26 then composes the two deceleration ratios Z1 and Z2 provided by the two rules (step 206), thereby determining the tool feedrate Fo (step 207). In this case, the above composition is found by the product of each value.

"Mathematical Expression 9" Z=Z1*Z2* . . . . . *Zn where n is the number of rules. The feedrate is determined by calculating the feedrate Fo corrected by multiplying the specified feedrate F by the feedrate deceleration ratio found according to Mathematical Expression 9.

$$Fo = F * \frac{(1-Z)}{100}$$

where Z is a resultant deceleration ratio in %. Complex control based on a plurality of rules can be achieved by thus finding a machining condition (tool feedrate) by the composition of plural results. In addition, the knowledge storage section 25 and inferring section 26 individually provided allow more complicated rules to be defined.

In this embodiment, the rules described in an optional format in the knowledge storage section 25 as shown in FIGS. 17(*a*) and 17(*b*) may be described in the form of an operation expression of functions. In FIGS. 17(*a*) and 17(*b*), for example, Function 1 and Function 2 are defined and an expression for operating on the result of these functions are defined as follows: "Mathematical Expression 10"

F=F1*F2

Mathematical Expression 10 indicates that the product of the result found by the operation of Function 1 (F1) and Function 2 (F2) is employed as a final result.

The inferring section 26 finds the operation result of each function as shown in FIG. 18 and composes these results according to the defined expression. Mathematical Expression 9 at step 206 is the defined expression.

If, for example, the following operation expression has been defined,

"Mathematical Expression 11" $F=(F1+F2+F3)/3*F4$ it means that the results calculated by Functions 1, 2 and 3 are averaged out and the average value obtained is multiplied by the result calculated by Function 4, thereby providing the final result. A rule can thus be defined by optionally defined functions and an expression defining such operation methods.

A fourth embodiment according to the present invention will now be described in reference to the appended drawings. In FIG. 13, rules to be stored in the knowledge storage section 25 are to be described in the IF ... THEN format of fuzzy inference control with the antecedent part (IF) indicating a condition under which a rule for changing the feedrate is judged and the consequent part (THEN) indicating operation to be performed if the condition in the antecedent part is satisfied or not satisfied. The rules are described in a so-called "production rule" format when values described in the rules are represented in a membership function format. This allows the knowledge storage section 25 to include "macro", general-purpose knowledge described by a rule and "micro", special-purpose knowledge represented by a membership function. The inferring section 26 deduces a conclusion by making fuzzy inference on the given membership functions on the basis of the rules described in the knowledge storage section 25.

As previously noted, fuzzy inference made in fuzzy control often employs the center of gravity in the result of the inference according to fuzzy-related maximum-minimum composition rules and is referred to as a maximum-minimum composition center of gravity method.

In this method, inference is performed in the following three steps as shown in FIG. 37:

(1) The conformity $a_i$ of each rule is calculated using given premises $x^0$, $y^0$;

(2) An inference result $C_i^*$ is found for each rule; and (3) The inference results obtained for all rules are synthesized to find $C^0$. As its weighted center of gravity, the inference result $Z^0$ of all rules is calculated.

There are a variety of other techniques that have been devised, e.g., a method of contracting $C_i$ $1/a_i$ times instead of finding $C_i^*$ by taking away the top of $C_i$ by $a_i$ as an interpretation of a fuzzy set $C_0$, a $C^0$ non-fuzzing method which calculates a median instead of a center of gravity, and a height method which selects the element of a trapezoid set that gives a maximum value. From the past experience, it is known that among a number of such techniques, the maximum-minimum composition center of gravity method produces a very excellent result.

FIG. 19 and FIGS. 20(*a*)–(*c*) illustrate rules provided in the knowledge storage section 25 according to the present invention. The rules described therein are those employed for drill feedrate control shown in FIG. 7(*a*) and FIG. 8(*a*).

Referring now to FIG. 19, R1 to R5 indicate rules which are composed to deduce a conclusion in the present embodiment. POS is a distance between the tool 31 and workpiece 30 in FIG. 7(*a*), + indicating a distance before the tool 31 makes contact with the workpiece 30 and—that after contact. 0 indicates a contact point. A1 is a membership function shown in FIG. 20(*a*), instructing that the tool feedrate be reduced slightly before the tool makes contact with the workpiece, kept at the reduced value for a while after the tool has made contact with the workpiece until the tool completely bites the workpiece, and returned to the original value after the tool has bitten completely.

ANG in FIG. 19 indicates the bevel of a workpiece surface where the tool makes contact, which is classified into five types of B1 to B5 according to the degree of the bevel. FIG. 20(*b*) shows the membership functions of B1 to B5. FEED in FIG. 19 is the deceleration ratio of the tool feedrate, indicating the degree of reducing the tool feedrate, which is classified into five stages of C1 to C5. FIG. 20*c* shows the membership functions of C1 to C5.

The rules in FIG. 19 indicate that the feedrate of the tool is reduced according to the bevel of the workpiece surface which the tool makes contact with, from immediately before the tool makes contact with the workpiece to when the tool completely bites the workpiece.

An example of an inferring procedure is as follows. Taking Rule 1 as an example, the distance between the tool and workpiece is found and its conformity is evaluated by using the membership function of A1 in FIG. 20(*a*). The bevel of the workpiece surface with which the tool makes contact is also found and its conformity is evaluated by using the membership function of B1 in FIG. 20(*b*). Since the rule in the antecedent part is an AND condition, the smaller value of these conformities is adopted and a result is found by using the membership function of C1 in FIG. 20(*c*). In a similar manner, the results of Rules 2 to 5 are found and composed, thereby deducing a conclusion. A max-min AND is employed as an example of making an addition and a center of gravity method as the process of composition. The conclusion thus deduced is used to correct the tool feedrate F as indicated in the following expression, which is employed as the tool feedrate.

"Mathematical Expression 12"

$$Fo = F * \frac{100 - Z}{100}$$

where Fo is the tool feedrate corrected, F is the feedrate instructed, and Z is the tool deceleration ratio deduced by fuzzy inference.

Figure 7A:
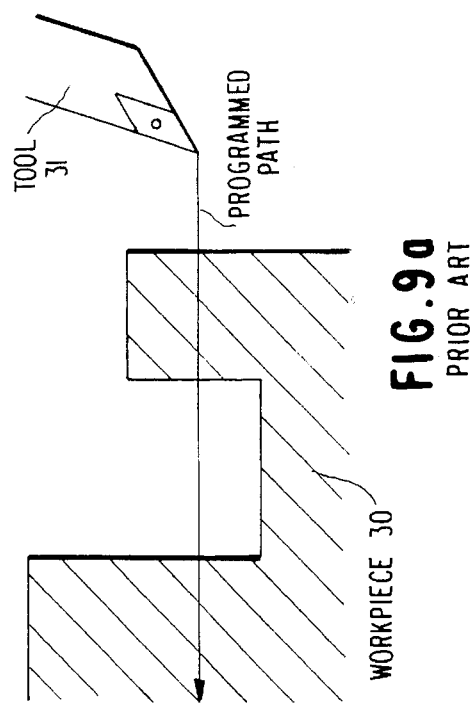
FIGS. 7(a) and 7(b) illustrate a drilling operation known in the art.
Figure 8A:
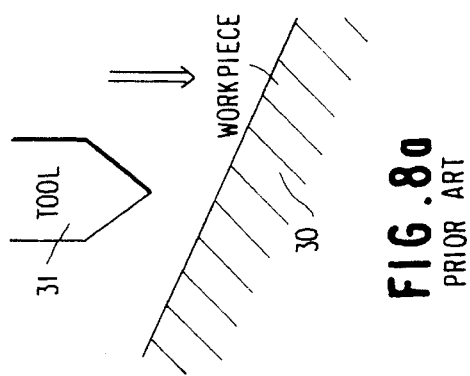
FIGS. 8(a) and 8(b) illustrate drilling in a tapered area known in the art.
Figure 7B:
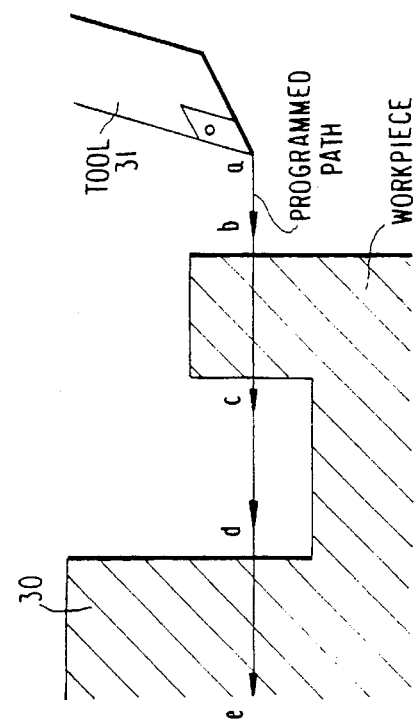
Figure 8B:
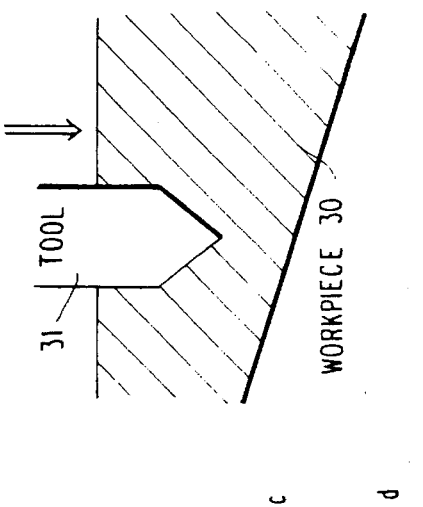
Figure 9B:
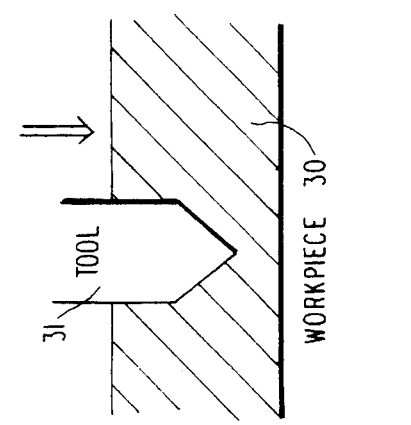

To the feedrate control in FIG. 7(*b*) and FIG. 8(*b*), the rules as shown in FIG. 19 and FIGS. 20(*a*)–(*c*) are also applicable in a similar manner. In this case, POS is a distance as to the surface of the workpiece 30 drilled through by the tool 31 and ANG is the bevel of this surface.

Figure 10:
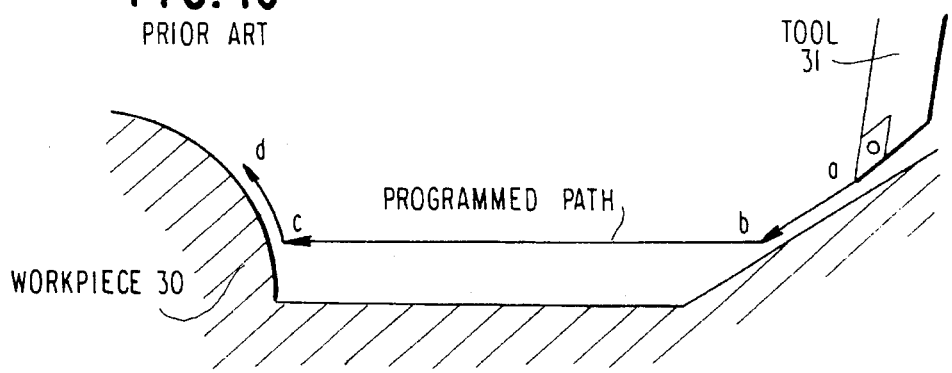
FIG. 10 illustrates the machining of a midway die known in the art.

In FIG. 10, the tool feedrate is controlled so as to be corrected according to the moving direction of the tool. The tool moving direction of zero assumes that the tool cuts the workpiece in parallel therewith, i.e., between b-c, the direction of + that the tool cuts the workpiece in a workpiece biting direction, i.e., between a-b, and the direction of—that the tool cuts the workpiece in a workpiece leaving direction, i.e., between c-d. With these tool moving directions entered as input data, a conclusion is extracted using membership functions shown in FIGS. 22(*a*) and 22(*b*). According to the tool feedrate deceleration ratio thus obtained, the corrected feedrate is found using Mathematical Expression 12.

In this case, when the tool moving direction is —, i.e., when the tool moves away from the workpiece, the deceleration ratio is—and the corrected feedrate rises above the instructed feedrate.

Figure 12:
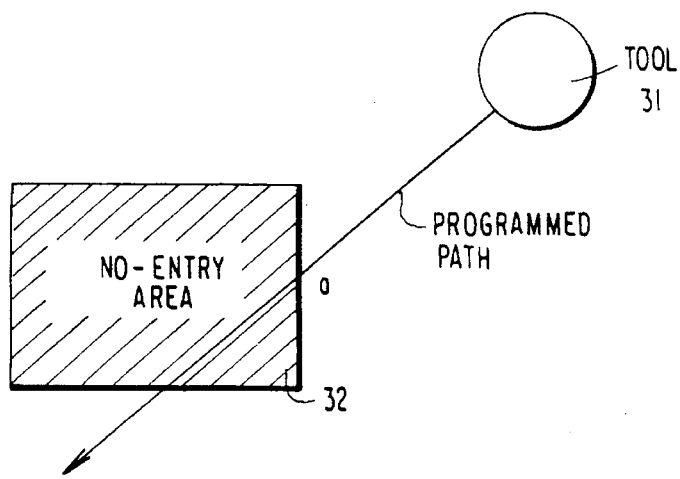
FIG. 12 illustrates control in no-entry area setting known in the art.
Figure 14:
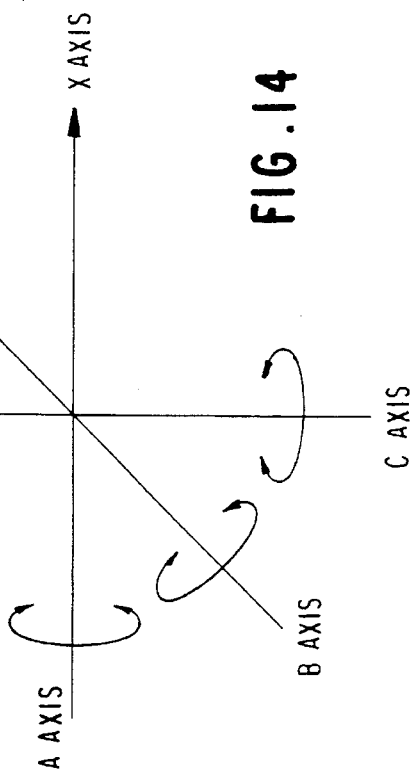
FIG. 14 illustrates control axes in the known numerical control unit.
Figure 25:
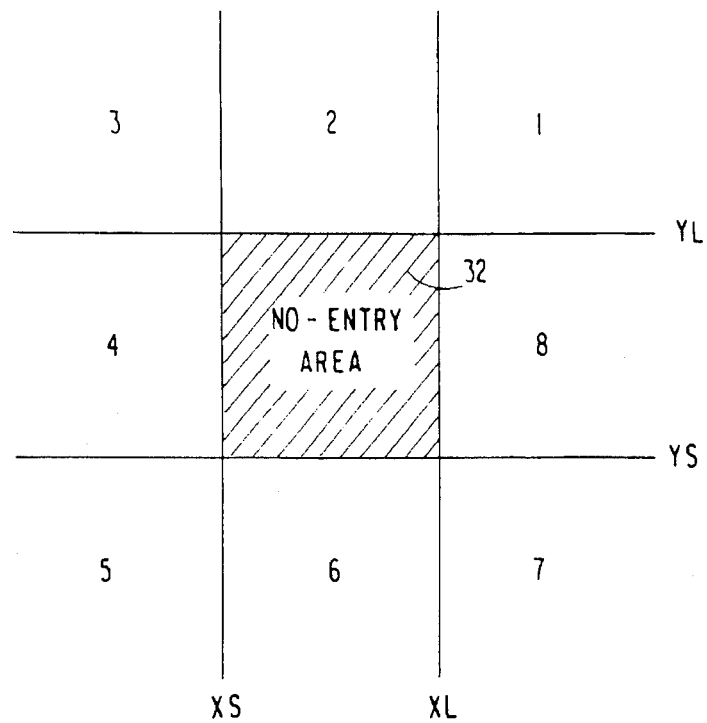
FIG. 25 illustrates how a distance between the no-entry area and tool is extracted according to the present invention.

In an example shown in FIG. 12, the distance between the tool 31 and no-entry area 32 is extracted for use as input data and the deceleration ratio is extracted according to membership functions shown in FIGS. 24(*a*) and 24(*b*) on the basis of rules shown in FIG. 23. The corrected tool feedrate is extracted by employing the extracted deceleration ratio according to Mathematical Expression 12. Here, it is determined where the tool exists relative to the no-entry area 32, among positions 1 to 8, as shown in FIG. 25 and the distance L between the tool 31 and no-entry area 32 is extracted as shown in a flowchart in FIG. 26 according to the tool position.

In the flowchart in FIG. 26, it is assumed that the tool position is (X, Y), the X-axis upper and lower limits of the no-entry area are XL and XS, and the Y-axis upper and lower limits of the no-entry area are YL and YS. At step 300, XL, XS, YL and YS are found to determine where the tool exists among the areas 1 to 8 shown in FIG. 25. At step 301, classification of one limit set is then made according to the values of XL, XS, YL and YS, and the distance L between the tool 31 and no-entry area 32 is extracted according to the classification result (step 302).

Figure 9A:
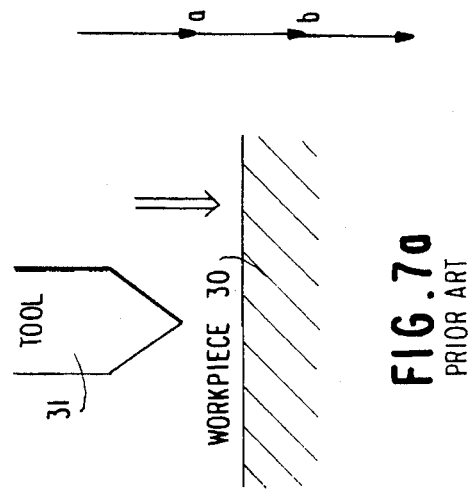
FIGS. 9(a) and 9(b) illustrate the machining of a molding material workpiece known in the art.
Figure 27:
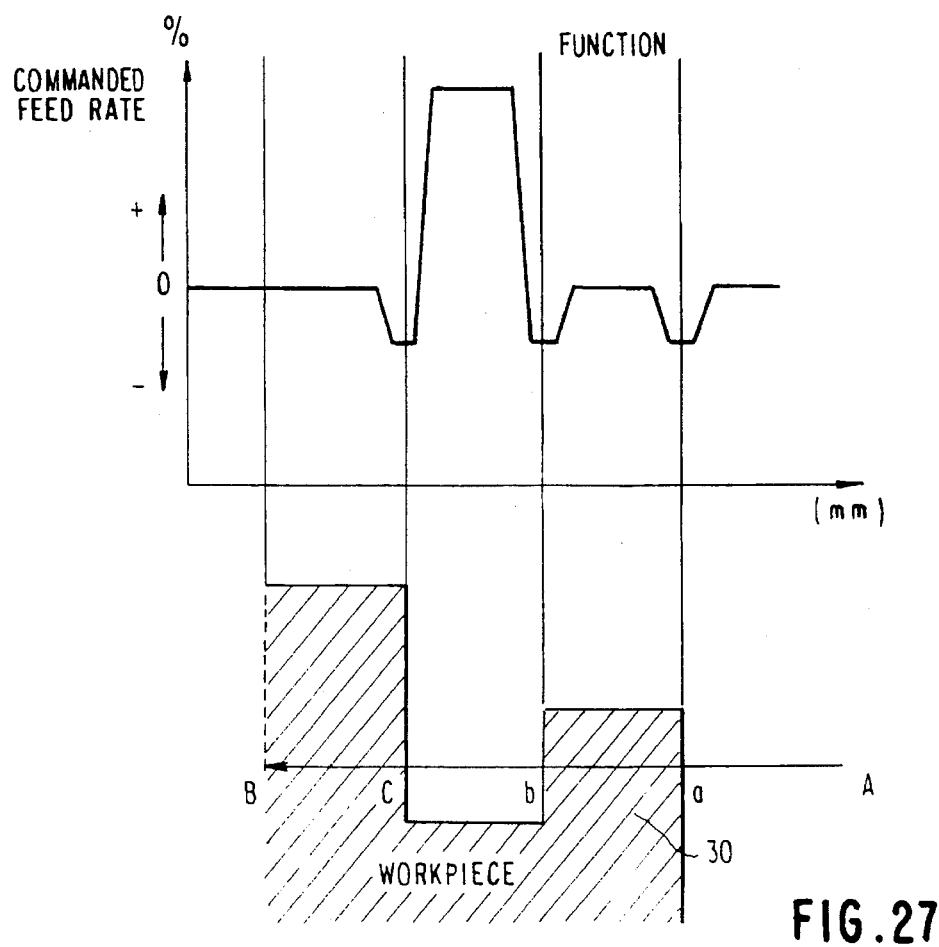
FIG. 27 shows an example of a function stored in the knowledge storage section according to the present invention.

A fifth embodiment concerned with the present invention will now be described in reference to the appended drawings. When a molding material is machined as shown in FIG. 9(a), it is desired to control the feedrate according to a workpiece shape. A function itself is therefore generated automatically from the workpiece shape. In CNC units including an automatic program, some contain a pre-entered material shape which is used as the basis for generating the function. FIG. 27 shows the function automatically generated, wherein the normal feed rate is shown as a zero (0) deviation value and increases or decreases in commanded rate are shown as plus (+) or minus (−) values of ratio or percentage. According to the workpiece shape, the feedrate is reduced slightly before the tool makes contact with the workpiece (point a), returned to the original value slightly after the tool has passed point a, decreased again slightly before it comes out of the workpiece (point b), increased to a permissible limit in an area where the workpiece does not exist (between b-c), dropped slightly before the tool makes contact with the workpiece again (point c), and restored to the original value slightly after the tool has passed point c.

Figures 28, 31:
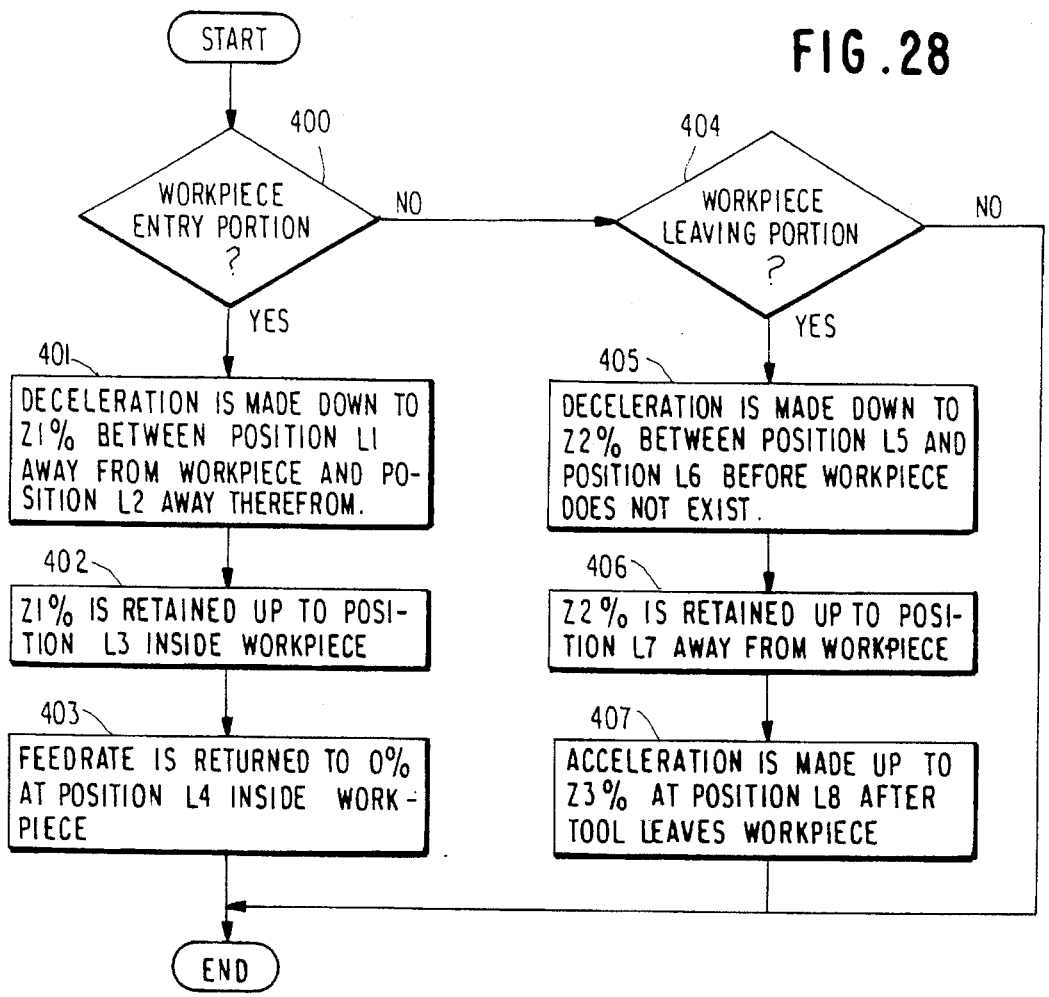
FIG. 28 is a flowchart showing a sequence of generating the function in the knowledge storage section according to the present invention.
FIG. 31 shows an example of a rule matrix in the knowledge storage section used to correct the feedrate in accordance with the tool and workpiece materials according to the present invention.

A process of generating the function in FIG. 27 will now be described in accordance with a flowchart in FIG. 28. A workpiece entry portion is judged (step 400) and the acceleration/deceleration pattern of the work entry portion is set (steps 401 to 403). The feedrate is first decreased down to Z1% between a position L1 away from the workpiece end face and a position L2 away therefrom (step 401). The feedrate is then kept at Z1% up to a position L3 inside the workpiece (step 402). The feedrate is returned to the original value up to a position L4 inside the workpiece (step 403). The above steps provide an acceleration/deceleration pattern wherein the feedrate is reduced immediately before the tool makes contact with the workpiece and returns to an ordinary value in a position where the tool has entered the workpiece by a certain distance. When the tool leaves the workpiece, a workpiece leaving portion is judged (step 404) and the acceleration/deceleration pattern of the portion where the tool leaves the workpiece is set (steps 405 to 407). The feedrate is first decreased down to Z2% between positions L5 and L6 before the tool leaves the workpiece (step 405). The feedrate is then kept at Z2% up to a position L7 away from the workpiece (step 406). The feedrate is raised to Z3% up to a position L8 away from the workpiece (step 407). The above steps provide an acceleration/deceleration pattern wherein the feedrate is reduced immediately before the tool leaves the workpiece and increases to a specified ratio after the tool has left the workpiece by a certain distance.

The function thus generated is used to correct the tool feedrate in actual machining. Namely, an acceleration/deceleration ratio is extracted relative to the specified feedrate F by using the function generated as shown in FIG. 27 and the corrected feedrate Fo is found as indicated by the following expression:

"Mathematical Expression 13"

$$Fo = F * \frac{100 + Z}{100}$$

where Z is the acceleration/deceleration ratio provided by the function in FIG. 27.

In this embodiment, the acceleration/deceleration ratio employed in the vertical axis of the function may be an actual feedrate. In this case, Mathematical Expression 13 is replaced by:

"Mathematical Expression 14" Fo=Z where Z is the corrected feedrate itself provided by the function.

Figure 11:
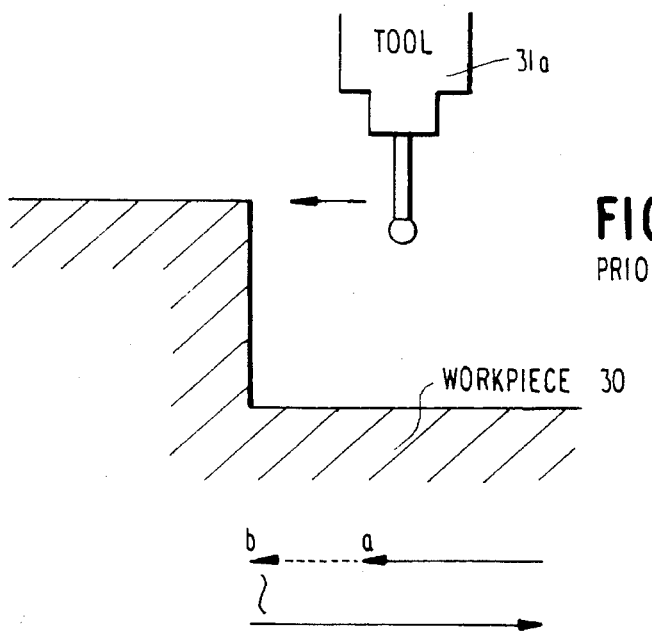
FIG. 11 illustrates a machining measurement function known in the art.

When the measurement operation shown in FIG. 11 is performed, remeasurement may be made after the workpiece 30 has been measured by the tool 31a. Also in this case, as shown in FIGS. 29(a)-29(c), the automatic generation of a function indicating the acceleration/deceleration pattern of a second feedrate achieves more accurate and useful measurement. In FIG. 29(b), Function 1 is the tool feedrate deceleration pattern of the first measurement. Because of the first measurement, its deceleration band is wide and its deceleration ratio is small in order to economize on measurement time.

In general, measurement accuracy decreases in proportion to the feedrate in measurement. According to the first measurement, the actual position of the workpiece is estimated with the drift value, etc., of a measurement sensor taken into account. A deceleration pattern like Function 2 in FIG. 29(c) is automatically generated in consideration of a predetermined clearance value for the estimated position of the workpiece. In Function 2, the deceleration band is narrow in order to reduce measurement time and the deceleration ratio is large in order to enhance measurement accuracy.

A sixth embodiment according to the present invention will now be described in reference to the appended drawings. Generally the feedrate of the tool greatly relies on the material of the workpiece to be machined and that of the tool employed for machining. Hence, it may be conceived that a standard feedrate is set and corrected according to the combination of the workpiece and tool materials. FIGS. 30(a)-30(c) show rules for the concept, wherein Ti (i=0 to 9) indicates a tool material and Wz (z=0 to 9) a workpiece material. If both the TOOLs and WORKpieces are classified finely (10 stages) as shown in FIGS. 30(b) and 30(c), the number of rules increases significantly. In the case of FIG. 30(a), the number of rules extends to 100 as indicated in FIG. 31. Hence, an attempt to perform an operation on all rules and extract their results will take an excessive amount of time in inference. Therefore, the only rules executed are those which relate to the TOOLs and WORKpieces corresponding to the material hardness of given tools and workpieces.

For example, if the material hardness of the tools and workpieces is given exactly in numerical values, membership functions indicated in FIG. 30(a) corresponding to these values are only inferred. If the membership function of T5 has the hardness value of $\alpha$ to $\beta$ and the hardness K of the given tool is as follows:

$$\alpha \leq K \leq \beta$$

T5 is judged as corresponding. If the material hardness of the tools and workpieces is ambiguous and given in membership functions, the membership functions of any of T0 to T9 and W0 to W9 falling within the range of the hardness of said given membership functions are judged as corresponding. If the areas of "Tool" and "Work" identified by arrows in FIGS. 30(a) and 30(b), respectively, are facts given to this membership function, then the membership functions whose areas consist of these given facts are "T4" and "T5" for "Tool", and "W6" and "W7" for "Work".

Figures 32A, 32B:
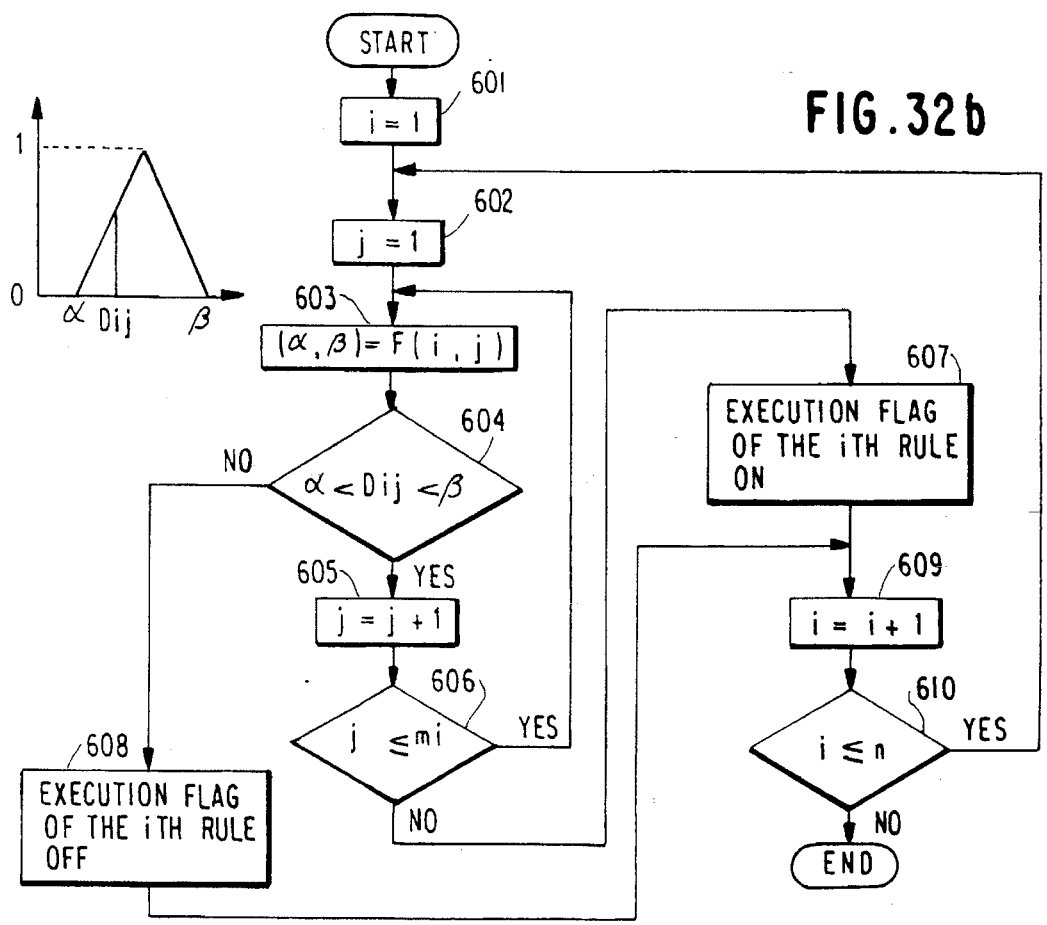
FIG. 32a shows an example of executing only corresponding rules in the rule matrix in the knowledge storage section used to correct the feedrate in accordance with the tool and workpiece materials according to the present invention.
FIG. 32(b) illustrates a relevant flowchart.

FIG. 32(a) indicates that since the membership functions of T4 to T5 among the Tools and the membership functions W6 to W7 among the workpieces correspond to the material hardness as the result of extraction, only rules F64, F65, F74 and F75 are executed to deduce a conclusion.

FIG. 32(b) is a flowchart indicating an algorithm which extracts rules to be executed. In FIG. 32(b), "i" indicates the number of a rule, and "j" indicates the number of a condition part of each rule. The number of rules in n, and the number of condition parts of each rule is mi. First, the i and j parameters are initialized, specifically, initialize as i=1 (Step 601), and next initialize as j=1 (Step 602). Then, extract the area ($\alpha$, $\beta$) of a membership function in an ith rule with a jth conditional part (Step 603). An area of membership function is a range of the value which a defined membership function takes in a horizontal direction. Check if Dij (fact), which is a value given to this membership function, exists in the area extracted in Step 603 (Step 604). In case Dij is not a specific value, for example, in case Dij is also a membership function, check if there is an overlapping section between Dij and ($\alpha$, $\beta$).

If Step 604 judges YES, then the value of j is increased by 1 (Step 605). Check if the value of j is within mi, i.e., check if there is a membership function of a conditional part which has not been judged by ith rule (Step 606). If Step 606 judges YES, then return to step 603. If its judgment is NO, then move to Step 607. In case Step 604 judges YES, turn the execution flag of the ith rule OFF (Step 608). In case step 606 judges NO, turn the execution flag of ith rule ON (Step 607). Execution flags at each of the rules are there to identify whether or not each rule should be executed. When fuzzy inference is made, only those rules whose flags are ON should be executed.

In processings from Step 602 to 608 if there is a rule without Dij, a value given to membership function, in an area of membership function of a conditional part of each rule, the rule will become 0 without fail so long as an inference is made with a MAX_MIN method. Because of it an execution flag of a rule is turned off since there is no need to make an inference.

Next increase the value of i by 1 (Step 609). Check if i is a value within n, i.e., check if it has been judged referring to all rules (Step 610). If Step 610 judges YES, i.e., there are still some rules to be judged then return to Step 602. If it is NO, the processing will be ended.

A seventh embodiment of the invention will now be described with reference to the appended drawings. Generally, various shapes (51 to 56) as shown in FIGS. 38(a)–38(f) may be conceived for membership functions employed for fuzzy inference.

In defining rules conventionally with reference to the example in FIG. 23, therefore, the rules are defined as indicated by R1 to R3 in FIG. 23 and membership functions A1, A2, A3, B1, B2 and B3 must separately be defined anew. For this reason, a man-machine interface dedicated to defining membership functions must be prepared and a large area set aside in a system for storing membership functions.

To solve such a problem, the present invention has enabled membership functions to be represented in a specific shape pattern and defined simultaneously with rules. An example is given by 57 in FIG. 39(a), wherein all membership functions are defined in the form of an isosceles triangle and Li indicates a center position and li a half length of the base of the isosceles triangle. When membership functions are defined as described above, they can be defined by the center (i.e., center of gravity position) Li and the half base length li of the shape 57 and it is therefore only necessary to enter Li and li. This allows rules and membership functions to be defined simultaneously as shown in FIG. 40, in relation to the rules in FIG. 23.

Figures 40, 41, 42:
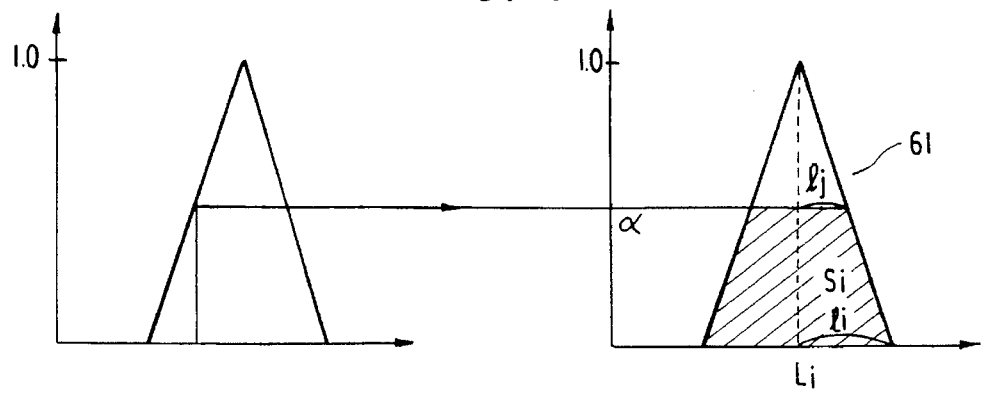
FIG. 40 illustrates the setting of production rules for fuzzy inference according to the present invention.
FIG. 41 illustrates an inference method for fuzzy inference according to the present invention.
FIG. 42 illustrates the setting of production rules for fuzzy inference according to the present invention.

Referring now to FIG. 40, A1, A2, A3, B1, B2 and B3 indicate the centers of respective membership functions and a1, a2, a3, b1, b2 and b3 the half base lengths of respective membership functions.

Membership functions may also be represented in other shape patterns as indicated by 58 in FIG. 39(b) wherein a dead zone is provided, or as indicated by 59 in FIG. 39(c) wherein the shape is asymmetrical. In this case, membership functions may be represented as (Li, li, mi) by using an additional parameter.

In general, most membership functions are defined in the shape indicated by 57 in FIG. 39(a). Hence, when membership functions are represented in the shape pattern of an isosceles triangle as indicated by 57 in deducing a conclusion from the conclusion part of a rule, an inference result is found as follows in relation to the membership functions 61 in the conclusion part for conformity $\alpha$ ($\leq \alpha \leq 1$) as shown in FIG. 41. Since the shape is an isosceles triangle, the center of gravity position is Li and the area value Si is:

$$Si = (lj + li)*\alpha/2$$

where lj is the half upper-base length of a trapezoid, li the half lower-base length thereof, and $\alpha$ a height.

$$li:lj = 1:(1-\alpha)$$

Therefore $$lj = (1-\alpha)li$$

Hence $$Si = (li + (1-\alpha)li)*\alpha/2$$
$$= (2-\alpha)*\alpha*li/2$$

Hence, the value of Si can be easily calculated by $\alpha$ and li and the conclusion can be deduced fast.

An eighth embodiment according to the present invention will now be described. In synthesizing the inference result of each rule as shown in FIG. 37 in the known fuzzy inference method, the shapes of the membership functions in the result of each rule are overlapped and the center of gravity of a shape thus obtained is found.

FIG. 33(d) shows a shape obtained by synthesizing the results of three rules illustrated in FIGS. 33(a)–33(c) and composing the shapes of three membership functions in the MAX MIN method. When the conclusion of each rule is thus composed, the shapes must be composed to extract a new shape, which takes time for processing, and in the example of FIGS. 33(a)–33(d), the result of Rule 2 has no influence of a final conclusion. Namely, referring to FIG. 33(b), the center position of the membership function in the conclusion part of Rule 2, if slightly shifted, does not have any influence on the final conclusion. Such a case has posed a problem that it is difficult to tune membership functions in the conventional method. In the present invention, therefore, a final conclusion L is found by making inference as indicated by Mathematical Expression 8 from the center of gravity position Li and area Si in the result of each rule. Here, n is the number of rules. In this method, the result of each rule always influences the final conclusion and shapes are not composed, whereby fuzzy inference processing can be performed at high speed. When combined with the seventh embodiment method, the eighth embodiment offers much faster processing.

A ninth embodiment according to the present invention will now be described. Since all rules are treated equally in the known fuzzy inference, the significance of specific rules cannot be reflected on a conclusion. Actually, however, the significance of rules must be taken into consideration in deducing a final conclusion. The present invention defines the significance of each rule as shown in FIG. 42 using, for example, VAL. VAL is given a larger value for a more significant rule and a less value for a less significant rule.

Assuming that the significance of each rule is $\beta i$, the final conclusion L is found by making inference as indicated by Mathematical Expression 9 from the center of gravity position Li and area Si. Here, n is the number of rules. In this way, fuzzy inference can be made with the significance of each rule taken into consideration. In addition, because the significance $\beta i$ is designed to permit a negative value, a negative rule can also be set. Specifically, the setting of a negative value to the significance renders an area value in the conclusion part of a rule negative, thereby setting a negative rule. This allows the setting of the following rule that cannot be defined in the conventional method:

If A is A1 THEN B is not B1

What is claimed is:

1. A numerical control unit for changing a cutting condition of a machine tool during machining of a workpiece, comprising:
   a knowledge storage section for storing at least two rules for changing the cutting condition, at least one of said rules defining a rate at which movement of the machine tool is changed based on the position of the machine tool with respect to a corner of the workpiece, said section further comprising a rule description part and assessment functions; and
   an inferring section for inferring the optimum value of the cutting condition on the basis of a number of said rules, including said at least one of said rules, stored in said knowledge storage section, said numerical control unit causing a workpiece to be machined in accordance with the cutting condition inferred by said inferring section.

2. A numerical control unit as claimed in claim 1, wherein said cutting position of the tool is defined with respect to a corner to be machined and said cutting condition comprises a feedrate.

3. A numerical control unit as defined in claim 1, wherein said inference section comprises fuzzy logic means for inferring a desired cutting condition according to the rules stored in said knowledge storage section, said rules comprising an antecedent part describing a condition to be judged and a consequent part describing operation to be performed if said condition is satisfactory or unsatisfactory, said numerical control unit causing a workpiece to be machined in accordance with the cutting condition fuzzy-inferred by said inference section.

4. A numerical control unit as claimed in claim 3, wherein said knowledge storage section and said inferring section are separate from each other and are adapted for modification independently of each other.

5. A numerical control unit as claimed in claim 1, wherein another one of said rules defines a rate at which movement of the machine tool is changed based on the position of the machine tool with respect to a bevel shape of the corner of the workpiece, and said number of said rules includes said another one of said rules.

6. A numerical control unit as claimed in claim 1, wherein said inferring section infers said optimum value of the cutting condition, which is an optimum value of a feedrate Fo of the machine tool, in accordance with the following formula:

$$Fo = F * \frac{(1-Z)}{100}$$

in which F is a specified feedrate; and $Z=Z1 * Z2 * \ldots Zn$ where n is the number of the rules.

7. A numerical control unit using fuzzy logic to control the cutting of a workpiece with a tool comprising:
   a knowledge storage section having a plurality of rules in an IF . . . THEN format for changing a cutting condition and comprising a rule description part and membership function part, at least one of said rules being established based on material characteristics of said tool;
   an inferring section for inferring the optimum value of the cutting condition on the basis of a number of said rules, including said at least one rule, stored in said knowledge storage section; and
   means for correcting a membership function in said knowledge storage section in accordance with a workpiece shape, said numerical control unit operating to make inference according to the corrected contents of said knowledge storage section.

8. A numerical control unit as claimed in claim 7, wherein the feedrate of a tool is determined by further making fuzzy inference on the basis of predetermined ones of said rules established according to material characteristics of the workpiece.

9. A numerical control machining unit for machining a workpiece, comprising:
   a knowledge storage section storing a plurality of rules, by which a cutting condition is defined, in a production rule format;
   an inferring section for inferring a desired cutting condition according to the rules stored in said knowledge storage section, said inferring section comprising:
   means for extracting only those rules that are to be judged from among a plurality of said rules stored in the knowledge storage section, said rules being extracted including at least one rule which defines a rate at which movement of the machine tool is changed based on a position of the machine tool with respect to a corner of the workpiece; and
   means for changing said cutting condition on the basis of only said extracted rules.

10. A numerical control machining unit as claimed in claim 9, wherein another one of said rules defines a rate at which movement of the machine tool is changed based on the position of the machine tool with respect to a bevel shape of the corner of the workpiece, and said number of said rules includes said another one of said rules.

11. A numerical control machining unit as claimed in claim 9, wherein said changing means changes said cutting condition, which is a feedrate Fo of the machine tool, in accordance with the following formula:

$$Fo = F * \frac{(1-Z)}{100}$$

in which F is a specified feedrate; and

Z=Z1 * Z2 ,... Zn where n is the number of the rules.

12. A numerical control unit for controlling the machining of a workpiece using fuzzy logic comprising:

a knowledge storage section for storing a plurality of rules in a production rule format, at least one of said rules defining a rate at which movement of the machine tool is changed based on a position of the machine tool with respect to a corner of the workpiece; and a fuzzy inference section that facilitates the definition of membership functions based on a number of said rules, including said at least one of said rules by representing membership functions employed for fuzzy inference as parameters of a specific shape pattern.

13. A numerical control unit as set forth in claim 12, wherein said pattern is an isosceles triangle.

14. A numerical control unit as set forth in claim 12, wherein said parameters comprise a pattern half base length and center of gravity position.

15. A numerical control unit as set forth in claim 13, wherein all membership functions employed in the conclusion part of fuzzy inference are represented as isosceles triangles.

16. A numerical control unit as claimed in claim 12, wherein another one of said rules defines a rate at which movement of the machine tool is changed based on the position of the machine tool with respect to a bevel shape of the corner of the workpiece, and said number of said rules includes said another one of said rules.

17. A method of controlling the machining of a workpiece using fuzzy logic comprising the steps of:

storing a first plurality of rules in a production format, at least one of said rules defining a rate at which movement of the machine tool is changed based on a position of the machine tool with respect to a corner of the workpiece;

storing input membership functions employed for fuzzy inference; and performing fuzzy inference on the input membership functions on the basis of a number of said stored rules, including said at least one of said rules, to derive output membership functions and deducing from said output membership functions a conclusion concerning the machining of said workpiece.

18. The method of controlling the machining of a workpiece as set forth in claim 17, wherein said storing of membership functions comprises storing said functions in a specific shape pattern.

19. The method of controlling the machining of a workpiece as set forth in claim 18, wherein said performing step comprises representing said output membership function for each of a second plurality of n of said rules as an area and center of gravity position for each of a corresponding geometric shape.

20. The method of controlling the machining of a workpiece as set forth in claim 19, wherein said area and center of gravity position are considered for a second plurality of rules relevant to the generation of a conclusion, where said second plurality is less than said first plurality.

21. The method of controlling the machining of a workpiece as set forth in claim 19, wherein said geometric shape comprises an isosceles triangle.

22. A method as claimed in claim 17, wherein another one of said rules defines a rate at which movement of the machine tool is changed based on the position of the machine tool with respect to a bevel shape of the corner of the workpiece, and said number of said rules includes said another one of said rules.

23. A method as claimed in claim 17, wherein said performing step deduces said conclusion, which is a feedrate Fo of the machine tool, in accordance with the following formula:

$$Fo = F * \frac{(1-Z)}{100}$$

in which F is a specified feedrate; and

Z=Z1 * Z2, ... Zn where n is the number of the rules.

* * * * *